United States Patent
Wu et al.

(10) Patent No.: US 12,323,239 B2
(45) Date of Patent: Jun. 3, 2025

(54) INTERLEAVER FOR CONSTELLATION SHAPING

(71) Applicant: QUALCOMM Incorporated, San Diego, CA (US)

(72) Inventors: Liangming Wu, Beijing (CN); Kexin Xiao, Shanghai (CN); Changlong Xu, Beijing (CN); Jian Li, Shanghai (CN); Kangqi Liu, San Diego, CA (US); Ruiming Zheng, Beijing (CN); Ori Shental, Marlboro, NJ (US); Hao Xu, Beijing (CN); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 18/253,147

(22) PCT Filed: Jan. 13, 2021

(86) PCT No.: PCT/CN2021/071399
§ 371 (c)(1),
(2) Date: May 16, 2023

(87) PCT Pub. No.: WO2022/151014
PCT Pub. Date: Jul. 21, 2022

(65) Prior Publication Data
US 2024/0007226 A1    Jan. 4, 2024

(51) Int. Cl.
*H04L 1/00* (2006.01)
*H04L 27/34* (2006.01)

(52) U.S. Cl.
CPC .......... *H04L 1/0042* (2013.01); *H04L 1/0071* (2013.01); *H04L 27/3411* (2013.01)

(58) Field of Classification Search
CPC .................................................... H04L 1/0042
See application file for complete search history.

(56) References Cited

U.S. PATENT DOCUMENTS 10,069,519 B1 *   9/2018   Millar ................... H04L 1/0042
11,012,187 B1 *   5/2021   Kim ..................... H04L 1/0047
(Continued)

FOREIGN PATENT DOCUMENTS

| CN | 111670543 A | 9/2020 |
|---|---|---|
| EP | 3413523 A1 | 12/2018 |
| WO | 2018133939 A1 | 7/2018 |

OTHER PUBLICATIONS

Yoshida, T., Alvarado, A., Karlsson, M et al.(2020); Post-FEC BER Benchmarking for Bit-Interleaved Coded Modulation With Probabilistic Shaping; Journal of Lightwave Technology, 38(16): Aug. 2020; http://dx.doi.org/10.1109/JLT.2020.2990620 (Year: 2020).*

(Continued)

*Primary Examiner* — Joseph D Torres
(74) *Attorney, Agent, or Firm* — Guang Y. Zhang; Shumaker & Sieffert, PA

(57) ABSTRACT

A wireless communication apparatus and method using probabilistic constellation shaping in connection with modulation. A wireless transmission device may determine a sequence of amplitude symbols from a sequence of information bits using a distribution matcher (DM) configured for probabilistic amplitude shaping. The device may further apply error correction coding to encode an information block corresponding to at least a portion of the sequence of amplitude symbols. And the device may generate a sequence of output symbols for transmission based on the encoded information block. The device may apply interleaving to one or more of the sequence of amplitude symbols, the information block, the encoded information block, or a combi- (Continued)

nation of the sequence of amplitude symbols and the encoded information block, for the generating of the sequence of output symbols.

28 Claims, 18 Drawing Sheets

(56) References Cited

U.S. PATENT DOCUMENTS

| | | | | |
|---|---|---|---|---|
| 11,637,598 | B2* | 4/2023 | Wu | H04B 7/0617 375/267 |
| 2018/0310262 | A1* | 10/2018 | Ly | H04W 56/001 |
| 2019/0052511 | A1 | 2/2019 | Gultekin et al. | |
| 2019/0245651 | A1* | 8/2019 | Yuan | H04L 1/0061 |
| 2019/0280809 | A1* | 9/2019 | Cho | H04L 25/03343 |
| 2020/0228386 | A1* | 7/2020 | Jardel | H04L 25/0212 |

OTHER PUBLICATIONS

Fabian Steiner; Coding for Higher-Order Modulation and Probabilistic Shaping; Dissertation, Feb. 2020 (Year: 2020).*

Jiafei Fang, Meihua Bi, Shilin Xiao, Hang Yang, Zhiyu Chen, Zhiyang Liu, Fan Yang, and Weisheng Hu; Polar coded probabilistic amplitude shaping for the free space optical atmospheric turbulence channel JIA; Optics Express; vol. 28, No. 22; Oct. 26, 2020 (Year: 2020).*

International Search Report and Written Opinion—PCT/CN2021/071399—ISA/EPO—Oct. 14, 2021 9 Pages.

ZTE: "Discussion on DL 1024QAM for NR FR1", 3GPP TSG RAN WG1 #103-e, R1-2007977, 3rd Generation Partnership Project, Mobile Competence Centre, 650, Route Des Lucioles, F-06921 Sophia-Antipolis Cedex, France, vol. RAN WG1, no. e-Meeting, Oct. 26, 2020-Nov. 13, 2020, Oct. 24, 2020, XP051946553, Nov. 13, 2020, 16 Pages, Retrieved on Oct. 24, 2020, Section 3, Part 3, Section 3, pp. 7 and 8, Figure 5.

Sheikh A., et al., "On Product Codes With Probabilistic Amplitude Shaping for High-Throughput Fiber-Optic Systems", IEEE Communications Letters, IEEE Service Center, Piscataway, NJ, US, vol. 24, No. 11, Jul. 27, 2020, pp. 2406-2410, XP011819424, Sections I-III, figure 1.

Supplementary European Search Report—EP21918231—Search Authority—Munich—Sep. 9, 2024 8 Pages.

Xie J., et al., "Probabilistic Shaping Combined With Spatially-Coupled LDPC Code in FTN System", 2020 IEEE/CIC International Conference on Communications in China (ICCC), IEEE, Aug. 9, 2020, pp. 1005-1009, XP033853352, Sections I-II, figures 1,2,4.

* cited by examiner

INTERLEAVER FOR CONSTELLATION SHAPING

This application is a national stage application under 35 U.S.C. § 371 of PCT Application No. PCT/CN2021/071399, filed Jan. 13, 2021, the entire content of which is hereby incorporated by reference.

TECHNICAL FIELD

The technology discussed below relates generally to wireless communication systems, and more particularly, to generation of a waveform utilizing probabilistic constellation shaping in connection with modulation to carry information.

INTRODUCTION

Many modern wireless communication systems employ a form of modulation commonly known as quadrature amplitude modulation (QAM). QAM is an effective technique for carrying binary digits (bits) of information, where a symbol of n bits is represented by transmission of two 90° out-of-phase sinusoidal signals (e.g., orthogonal or quadrature signals) at a given carrier frequency (e.g., a subcarrier or tone). However, usage of QAM with a typical grid-like constellation with uniform bit-probability has been empirically demonstrated to be limited to an achievable capacity that fails to meet the Shannon capacity. As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an example, a method of wireless communication is disclosed. The method comprises: determining a sequence of amplitude symbols from a first sequence of information bits using a distribution matcher configured for probabilistic amplitude shaping; applying error correction coding to encode an information block corresponding to at least one portion of the sequence of amplitude symbols; generating a sequence of output symbols based on the encoded information block; and applying interleaving to one or more of the sequence of amplitude symbols, the information block, the encoded information block, or a combination of the sequence of amplitude symbols and the encoded information block, for the generating of the sequence of output symbols.

In another example, means for performing operations of a method are disclosed, where the method comprises: determining a sequence of amplitude symbols from a first sequence of information bits using a distribution matcher configured for probabilistic amplitude shaping; applying error correction coding to encode an information block corresponding to at least one portion of the sequence of amplitude symbols; generating a sequence of output symbols based on the encoded information block; and applying interleaving to one or more of the sequence of amplitude symbols, the information block, the encoded information block, or a combination of the sequence of amplitude symbols and the encoded information block, for the generating of the sequence of output symbols.

In another example, a method is disclosed for segmenting a sequence of information bits into a first sequence of information bits and a second sequence of information bits; determining a sequence of amplitude symbols based on the first sequence of information bits utilizing a distribution matcher configured for probabilistic amplitude shaping; mapping the sequence of amplitude symbols to a sequence of binary symbols; combining the second sequence of information bits and the sequence of binary symbols to form an information block; applying error correction coding to the information block to generate a sequence of parity bits; determining a sequence of sign bits from the sequence of parity bits; combining the sequence of amplitude symbols and the sequence of sign bits to form a sequence of encoded amplitude symbols; interleaving the sequence of encoded amplitude symbols to generate a sequence of output symbols; and transmitting, via the transceiver, a waveform modulated according to the sequence of output symbols.

In another example, an apparatus for wireless communication is disclosed, the apparatus comprising: a processor; a transceiver communicatively coupled to the processor; and a memory communicatively coupled to the processor, wherein the processor and the memory are configured to: segment a sequence of information bits into a first sequence of information bits and a second sequence of information bits; determine a sequence of amplitude symbols based on the first sequence of information bits utilizing a distribution matcher configured for probabilistic amplitude shaping; map the sequence of amplitude symbols to a sequence of binary symbols; combine the second sequence of information bits and the sequence of binary symbols to form an information block; apply error correction coding to the information block to generate a sequence of parity bits; determine a sequence of sign bits from the sequence of parity bits; combine the sequence of amplitude symbols and the sequence of sign bits to form a sequence of encoded amplitude symbols; interleave the sequence of encoded amplitude symbols to generate a sequence of output symbols; and transmit, via the transceiver, a waveform modulated according to the sequence of output symbols.

In another example, a method is disclosed for segmenting a sequence of information bits into a first sequence of information bits and a second sequence of information bits; determining a sequence of amplitude symbols based on the first sequence of information bits utilizing a distribution matcher configured for probabilistic amplitude shaping; interleaving the sequence of amplitude symbols to generate a sequence of interleaved amplitude symbols; mapping the sequence of amplitude symbols to a sequence of binary symbols; combining the second sequence of information bits and the sequence of binary symbols to form an information block; applying error correction coding to the information block to generate a sequence of parity bits; determining a sequence of sign bits from the sequence of parity bits; interleaving the sequence of sign bits to generate a sequence of interleaved sign bits; combining the sequence of interleaved amplitude symbols and the sequence of interleaved sign bits to form a sequence of output symbols; and transmitting a waveform modulated according to the sequence of output symbols.

In another example, a non-transitory computer-readable medium storing computer-executable code is disclosed. In one example, the code, when executed, causes a wireless transmitting device to: segment a sequence of information bits into a first sequence of information bits and a second sequence of information bits; determine a sequence of amplitude symbols based on the first sequence of information bits utilizing a distribution matcher configured for probabilistic amplitude shaping; interleave the sequence of amplitude symbols to generate a sequence of interleaved amplitude symbols; map the sequence of amplitude symbols to a sequence of binary symbols; combine the second sequence of information bits and the sequence of binary symbols to form an information block; apply error correction coding to the information block to generate a sequence of parity bits; determine a sequence of sign bits from the sequence of parity bits; interleave the sequence of sign bits to generate a sequence of interleaved sign bits; combine the sequence of interleaved amplitude symbols and the sequence of interleaved sign bits to form a sequence of output symbols; and transmit a waveform modulated according to the sequence of output symbols.

In another example, an apparatus for wireless communication is disclosed, the method comprising means for transmitting a waveform modulated according to a sequence of output symbols is disclosed. As an example, the apparatus comprises means for segmenting a sequence of information bits into a first sequence of information bits and a second sequence of information bits; means for determining a sequence of amplitude symbols based on the first sequence of information bits utilizing a distribution matcher configured for probabilistic amplitude shaping; means for mapping the sequence of amplitude symbols to a sequence of binary symbols; means for combining the second sequence of information bits and the sequence of binary symbols to form an information block; means for interleaving the information block to generate an interleaved information block; means for applying error correction coding to the interleaved information block to generate a sequence of parity bits; means for determining a sequence of sign bits from the sequence of parity bits; means for combining the sequence of amplitude symbols and the sequence of sign bits to form a sequence of output symbols; and means for transmitting a waveform modulated according to the sequence of output symbols. In another example, a method of wireless communications disclosed, the method comprising those operations that are configured to be performed by the means attributed to such an apparatus.

In another example, means for processing a waveform received from a transmitter are disclosed, where the transmitter performs interleaver and probabilistic constellation shaping operations in order to transmit the waveform to a receiver, and where the receiver includes means for performing de-interleaver and demodulation operations in order to process the probabilistically shaped waveform.

These and other aspects of the disclosed technology will become more fully understood upon a review of the detailed description, which follows. Other aspects, features, and embodiments will become apparent to those skilled in the art, upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
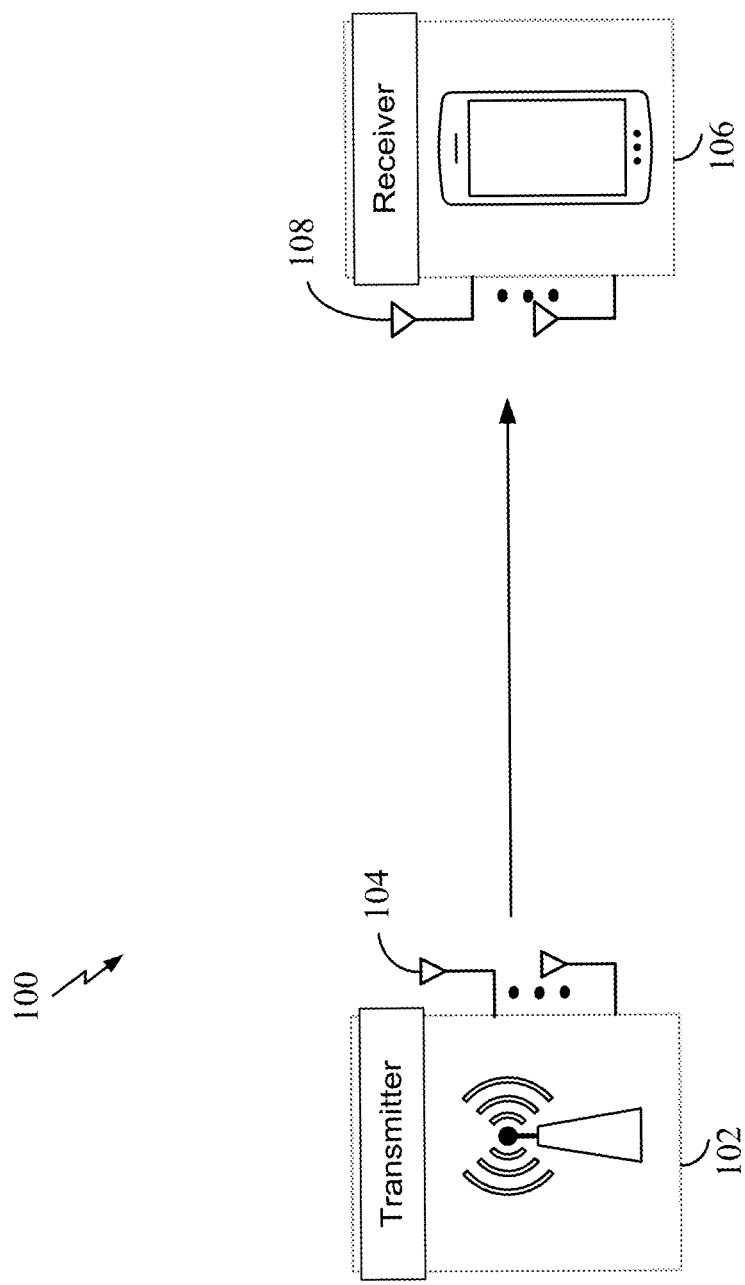
FIG. 1 is a schematic illustration of a wireless communication link according to some aspects of this disclosure.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication link 100 between a transmitter 102 and a receiver 106.

The wireless communication link 100 may operate according to any suitable wireless communication technology or technologies to provide communication between the transmitter 102 and the receiver 106. As one example, the wireless communication link 100 may operate according to $3^{rd}$ Generation Partnership Project (3GPP) New Radio (NR) specifications, often referred to as 5G or 5G NR. As another example, the wireless communication link 100 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

In the illustrated example, the transmitter 102 is shown as a base station, and the receiver 106 is shown as a wireless user equipment (UE). However, this configuration is provided only for ease of description, and in various examples, the wireless communication link 100 may link any two or more wireless communication nodes of any suitable kind or category. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

A UE may be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication. Such UE components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A UE may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A UE may additionally be a digital home or smart home device such as a home audio, video, and/or multimedia device, an appliance, a vending machine, intelligent lighting, a home security system, a smart meter, etc. A UE may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data and/or for relevant quality of service (QoS) for transport of critical service data.

Wireless communication between a transmitter 102 (e.g., a base station) and a receiver 106 (e.g., a UE) may be described as utilizing an air interface. Transmissions over the air interface from a base station to one or more UEs may be referred to as downlink (DL) transmission. In accordance with certain aspects of the present disclosure, the term "downlink" may refer to a point-to-multipoint transmission originating at a scheduling entity (described further below; e.g., a base station). Another way to describe this scheme may be to use the term broadcast channel multiplexing. Transmissions from a UE to a base station may be referred to as uplink (UL) transmissions. In accordance with further aspects of the present disclosure, the term "uplink" may refer to a point-to-point transmission originating at a scheduled entity (described further below; e.g., a UE).

In some examples, access to the air interface may be scheduled, wherein a scheduling entity (e.g., a base station) allocates resources for communication among some or all devices and equipment within its service area or cell. Within the present disclosure, as discussed further below, a scheduling entity may be responsible for scheduling, assigning, reconfiguring, and releasing resources for one or more scheduled entities (e.g., UEs). That is, for scheduled communication, a UE, which may be a scheduled entity, may utilize resources allocated by a scheduling entity (e.g., a base station or another UE).

Base stations are not the only entities that may function as scheduling entities. That is, in some examples, a UE may function as a scheduling entity, where the UE is configured for scheduling resources for one or more scheduled entities (e.g., one or more other UEs) in a wireless communication system.

In some aspects of the disclosure, the scheduling entity and/or scheduled entity may be configured for beamforming and/or multiple-input multiple-output (MIMO) technology. In a MIMO system, a transmitter 102 includes multiple transmit antennas 104 and a receiver 106 includes multiple receive antennas 108. The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

Figure 2:
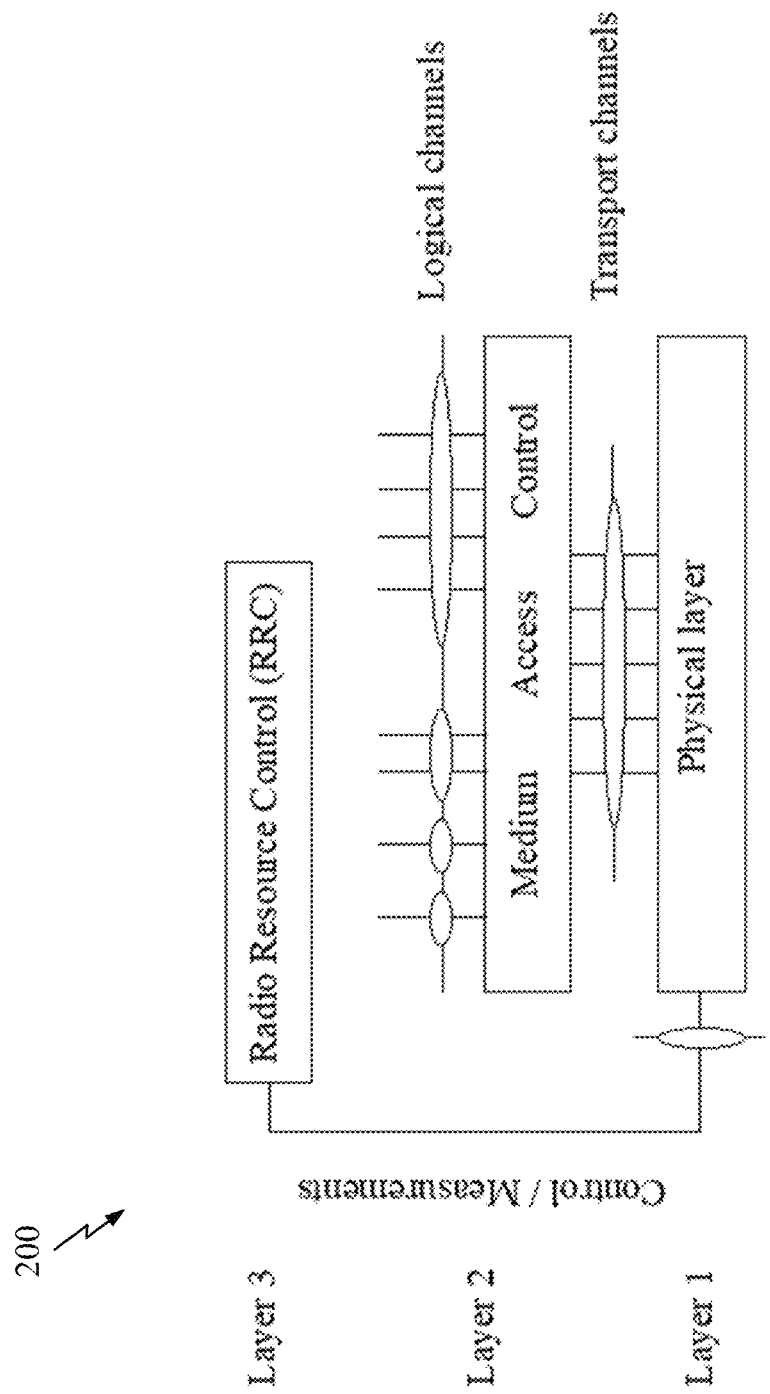
FIG. 2 is a schematic illustration of an example of a radio interface protocol architecture around a physical layer according to some aspects of this disclosure.

A radio protocol architecture may take on various forms depending on the particular application. An example for a NR system will now be presented with reference to FIG. 2, which schematically illustrates a radio interface protocol architecture around the physical layer (Layer 1). The physical layer interfaces the Medium Access Control (MAC) sub-layer of Layer 2 and the Radio Resource Control (RRC) Layer of Layer 3. The circles between different layer/sub-layers indicate Service Access Points (SAPs). The physical layer offers a transport channel to MAC. The transport channel is characterized by how the information is transferred over the radio interface. MAC offers different logical channels to the Radio Link Control (RLC) sub-layer of Layer 2. A logical channel is characterized by the type of information transferred.

The RRC sublayer is responsible for obtaining radio resources (e.g., radio bearers) and for configuring the lower layers using RRC signaling between a base station and UE. The MAC sublayer has various functions, such as allocating the various radio resources (e.g., resource blocks) in one cell among the UEs HARQ operations, etc. The physical layer also has various functions, such as channel coding, scrambling, modulation, transform precoding, mapping, etc.

In some examples, a MAC entity of a UE is configured to handle one or more transport channels. Example transport channels that the MAC entity may handle include: Broadcast Channels (BCHs); Downlink Shared Channels (DL-SCHs); Paging Channels (PCHs); Uplink Shared Channels (UL-SCHs); and Random Access Channels (RACHs), among others. In some examples, a UE may use a single MAC entity; and in some examples, a UE may use a plurality of MAC entities (e.g., one for a Master Cell Group (MCG) and one for a Secondary Cell Group (SCG) in a network configured for Dual Connectivity). Example MAC entities used by a UE may include source MAC entities and target MAC entities.

Figure 3:
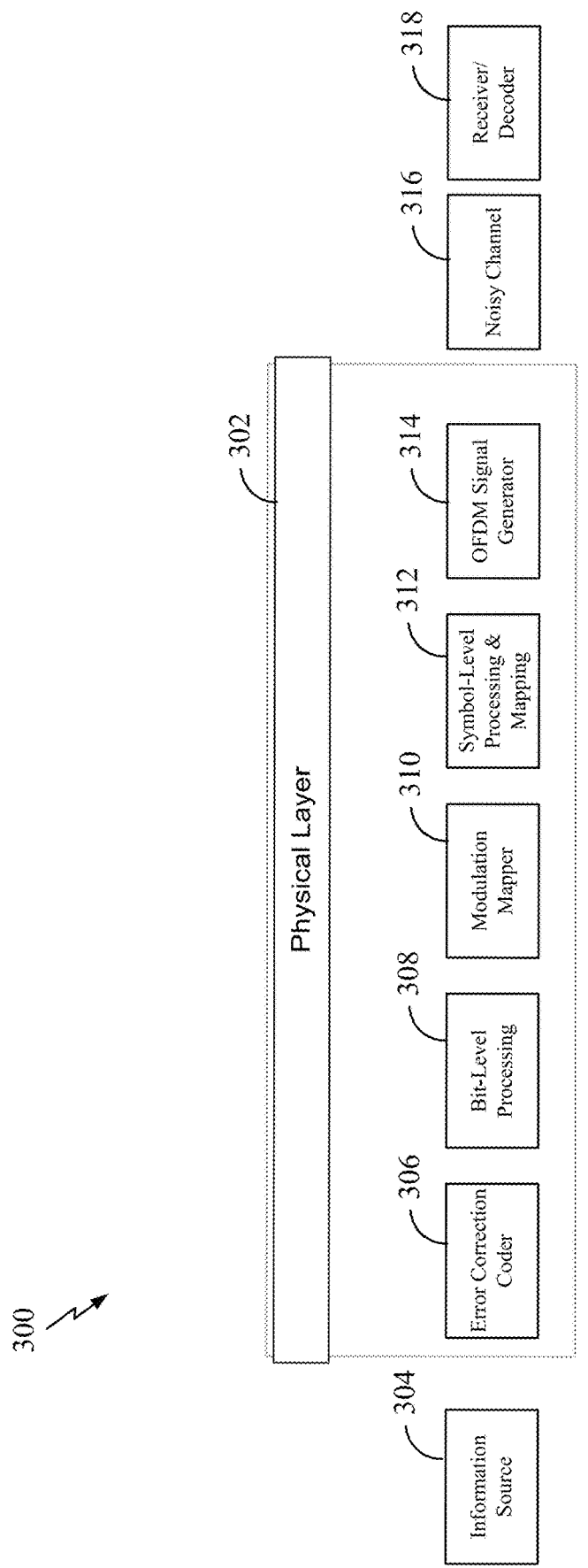
FIG. 3 is a block diagram illustrating an example of a physical layer entity of a transmitting device according to some aspects of this disclosure.

FIG. 3 is a schematic illustration providing additional information with respect to some components of a physical layer 302. The block diagram provided in FIG. 3 is not intended to show all components of a given physical layer, but is rather to be understood as providing some functional detail of a portion of an exemplary physical layer for the purpose of explanation of certain aspects of this disclosure. As shown in FIG. 3, a physical layer may receive a message or a set of information for communication from any suitable information source 304. For example, the MAC layer may provide a message to the physical layer 302 for transmission.

An error correction coder 306, or channel coder, employs forward error correction to map sequences of message bits (e.g., information blocks, code blocks, code block groups, etc.) to longer, redundant sequences (e.g., codewords). That is, in order for transmissions over a noisy channel 316 to obtain a low block error rate (BLER) while still achieving very high data rates, an error correction coder 306 may implement channel coding. Wireless communication according to various aspects of this disclosure may generally utilize any suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for bit errors that may occur due to the noise.

In 5G NR specifications, user data may be coded using quasi-cyclic low-density parity check (LDPC) with two different base graphs: one base graph for large code blocks and/or high code rates, while the other base graph is used otherwise. Control information and a physical broadcast channel (PBCH) may be coded using Polar coding, based on nested sequences. For these channels, puncturing, shortening, and repetition are used for rate matching.

Those skilled in the art will understand that aspects of the present disclosure may be implemented utilizing any suitable channel code. Various implementations of scheduling entities (e.g., base station 102, or a UE 106) and scheduled entities 106 (e.g., UE 106) may include suitable hardware and capabilities (e.g., an encoder, a decoder, and/or a CODEC) to utilize one or more of these channel codes for wireless communication.

A bit-level processing block 308 can perform various functions such as scrambling, interleaving, etc., at a bit level. That is, according to some aspects of this disclosure, a bit-level processing block may be, and/or may include an interleaver. The following description provides further detail of an exemplary interleaver configured according to 3GPP specification for 5G NR, but those skilled in the art will comprehend that this is merely one example and other suitable interleavers may be employed within the scope of this disclosure.

Figure 18A:
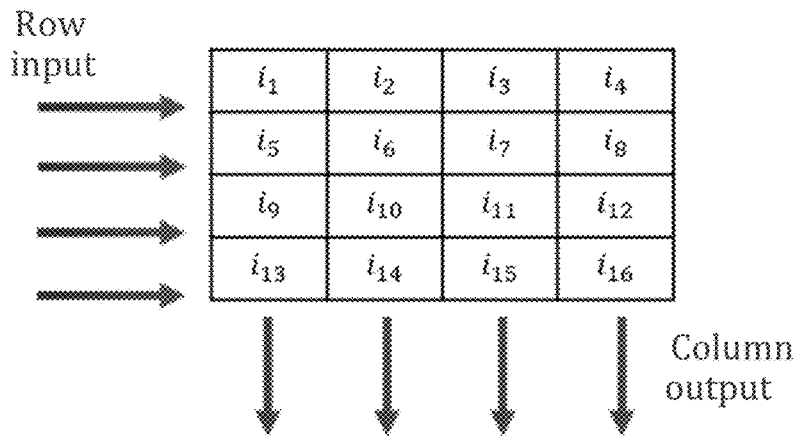
FIGS. 18A-18C are block diagrams illustrating exemplary interleaver designs for employing interleaving for transmission of a PAS waveform, according to some aspects of this disclosure according to some aspects of this disclosure.
Figure 18B:
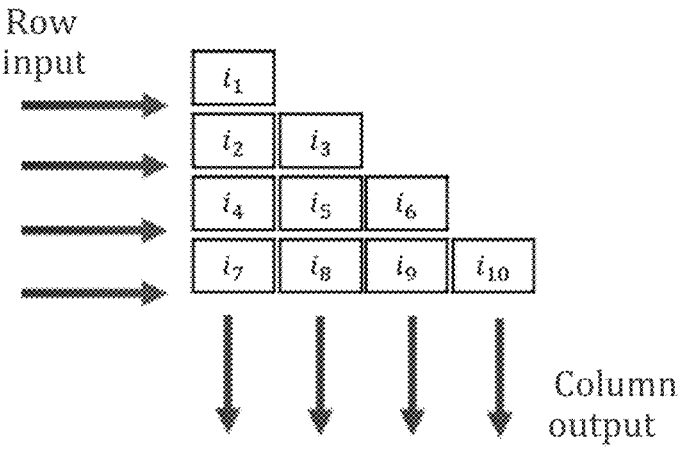
Figure 18C:
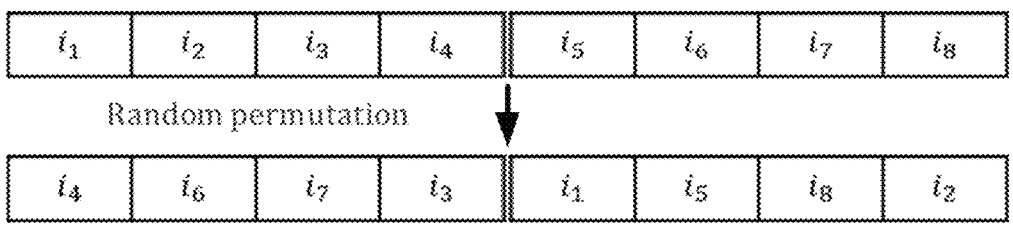

A bit-level interleaver, as used in various examples throughout this disclosure, may be configured in a number of different variations, such as a rectangular interleaver (e.g., FIG. 18A), as a triangular interleaver (FIG. 18B), or a random-type interleaver (FIG. 18C). It will be understood that a random-type interleaver is a particular type of interleaver referred to in the art as a "random interleaver" as shown, for example, in FIG. 18C and as described herein. In some examples, a rectangular interleaver may be configured to interleave a first bit sequence (e.g., $e_1, e_2, e_3, \ldots, e_{E-1}$) to provide a second bit sequence (e.g., $f_1, f_2, f_3, \ldots, f_{E-1}$). In another example, a triangular interleaver may be configured to interleave a first bit sequence (e.g., $c_0, c_1, \ldots, c_{K-1}$) to provide a second bit sequence (e.g., $c'_0, c'_1, \ldots, c'_{K-1}$).

In another example, a random interleaver may be configured to generate one or more random permutation patterns from an input sequence of bits or symbols. In an example, a random interleaver may generate a random sequence based on the input sequence of bits (or symbols) using a predefined initializer. While bit interleaving is discussed herein for some examples, it will be understood that the techniques of this disclosure are not so limited, and that the triangular interleaver, the random interleaver, and the rectangular interleaver may be utilized to interleave symbols. As an example, instead of interleaving a first sequence of bits to provide a second sequence of bits, any of the interleaver types may be used to interleave a first sequence of symbols to provide a second sequence of symbols.

In some examples, an interleaver may interleave a first bit sequence into a second bit sequence using (e.g., according to) a predefined interleaving pattern. In an example, a predefined interleaving pattern may be defined in one or more predefined tables. As an illustrative example, a bit-level interleaver may include an interleaver configured for us in NR LDPC channel coding. In a non-limiting example, a bit-level interleaver used in any one or more of the various implementations of this disclosure may be a rectangular interleaver defined for use in NR LDPC coding implementations. While rectangular interleavers are used for illustration purposes, the techniques of this disclosure are not so limited, and it will be understood that other interleaver types may be used to interleave symbols or interleave bits in accordance with one or more of the various techniques of this disclosure.

In some examples, a bit-level interleaver (or symbol-level interleaver for that matter) may be based at least in part on a modulation order employed by transmitter 102 to modulate symbols as transmitter 102 transmits an information message to a receiver (e.g., receiver 106). In some instances, a modulation order may be assumed for use in the interleaver operation. In an example, transmitter 102 may determine a maximum modulation order. The maximum modulation order assumed may have a value of 'X' that may include an assumed value configured to serve as a computational assumption for the bit-level interleaver operation in implementations that have an interleaver formula that depends on a modulation order value. The value of 'X' in such instances may, in some examples, be equal to eight (8) or six (6). This value may be dependent on a maximum modulation order that transmitter 102 is configured to assume based on the QAM order that transmitter 102 is to utilize when transmitting a signal (e.g., 'qam256', etc.).

In another example, a symbol-level interleaver may interleave a first sequence of symbols to provide a second sequence of symbols based on a modulation order used. In some examples, transmitter 102 may select one or more of the different types of interleavers to utilize in the various examples described throughout this disclosure. In such examples, transmitter 102 may select any interleaver to use for the one or more interleavers of any given example in this disclosure irrespective of the relative location for the implementation of a respective interleaver in the sequence of operations (e.g., channel coding, then interleaving, etc.; interleaving, then channel coding, etc.; etc.).

Physical resource blocks (PRBs, each including a set of subcarriers or tones) are the basic scheduling unit in NR. PRBs may be numbered or indexed within a given bandwidth part (BWP), e.g., from 0 to $N_{PRB}-1$, where $N_{PRB}$ represents the number of PRBs. Virtual resource blocks (VRBs) are defined within a BWP, and may be similarly numbered or indexed, e.g., from 0 to $N_{VRB}-1$, where $N_{VRB}$ represents the number of VRBs. In some examples, an interleaver (e.g., a bit-level interleaver) may map VRBs to PRBs across a BWP to take advantage of frequency diversity. Any suitable interleaving pattern may be employed, and may operate on one, two, four, or any other suitable group of RBs for interleaving. In some examples, an interleaver may read VRBs in rows, and write the information to PRBs in columns. This interleaver may perform interleaving operations in addition to the bit-level and symbol-level interleaving operations discussed herein for probabilistic constellation shaping, such as the interleavers utilized to interleave outputs from a channel coding process, inputs to a channel coding process, and/or symbol outputs from the distribution matching (DM) process (e.g., encoded symbol outputs and/or pre-coded symbol outputs), as described herein.

A modulation mapper 310 maps sequences of bit to corresponding symbols (e.g., complex numbers) according to a selected modulation scheme. Modulation refers to the way a carrier signal is modulated, or varied over time, to represent information to be transmitted.

Figure 4:
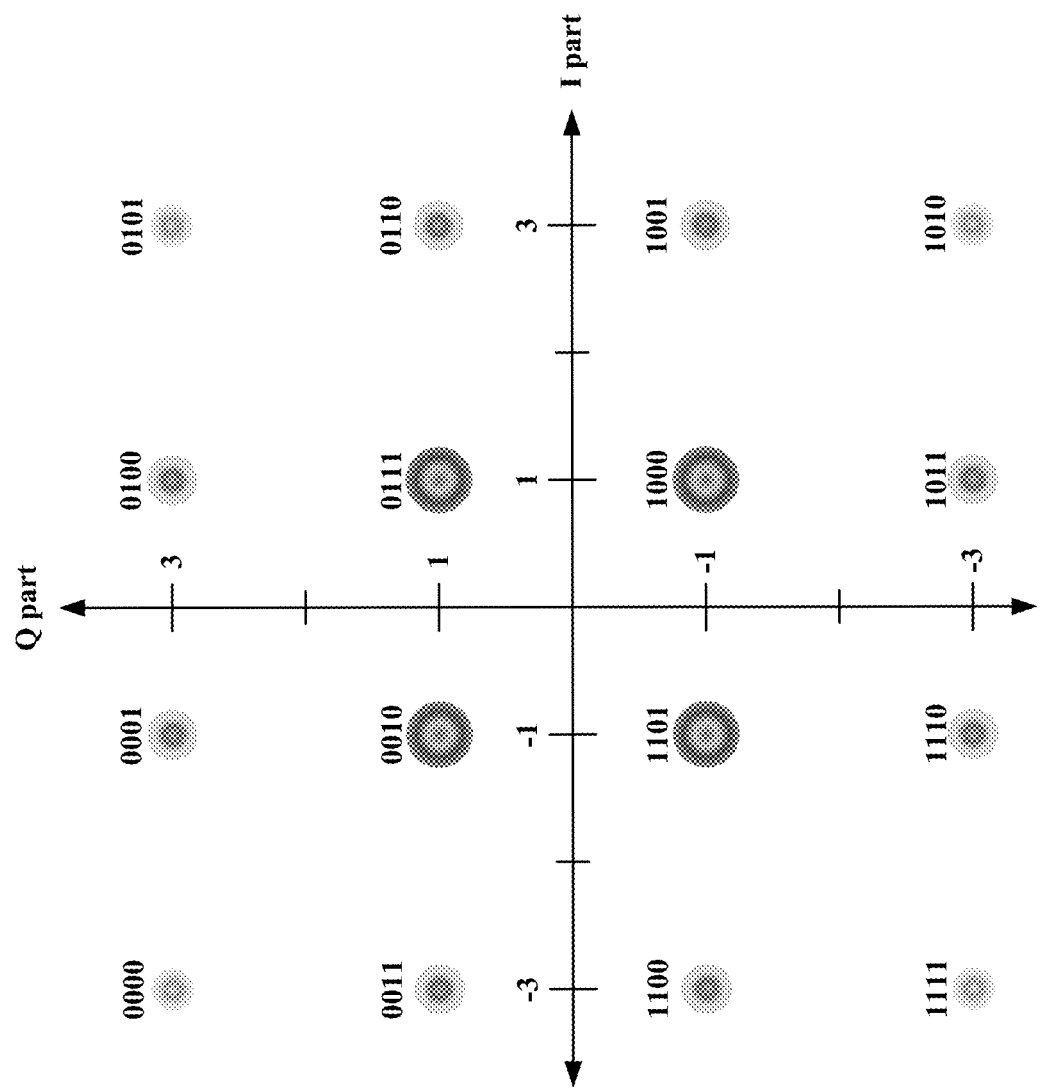
FIG. 4 is a constellation diagram showing examples of a probabilistically shaped constellation for quadrature amplitude modulation (QAM) according to some aspects of the disclosure.

Many modern wireless communication systems employ a form of modulation commonly known as quadrature amplitude modulation (QAM). QAM is an effective technique for carrying binary digits (bits) of information, where a symbol of n bits is represented by transmission of two 90° out-of-phase sinusoidal signals (e.g., orthogonal or quadrature signals) at a given carrier frequency (e.g., a subcarrier or tone). QAM is readily understood with reference to a constellation diagram. Referring now to FIG. 4, in a typical constellation diagram for QAM, a set of constellation points is arranged in a grid, and is mapped to the complex plane. In a constellation diagram with $2^n$ constellation points, each constellation point can represent a predefined n-bit sequence or symbol. For example, in the illustration, 16-QAM is shown, with $2^4=16$ constellation points each representing a respective 4-bit sequence or symbol. By treating the amplitudes of the respective quadrature signals as representative of a real part and an imaginary part of a complex number, in theory a transmission can represent any suitable complex number. With QAM, a modulation mapper maps an n-bit sequence to the appropriate complex number in the corresponding constellation diagram, and the amplitudes of the quadrature signals are scaled to represent the corresponding complex number.

Figure 10:
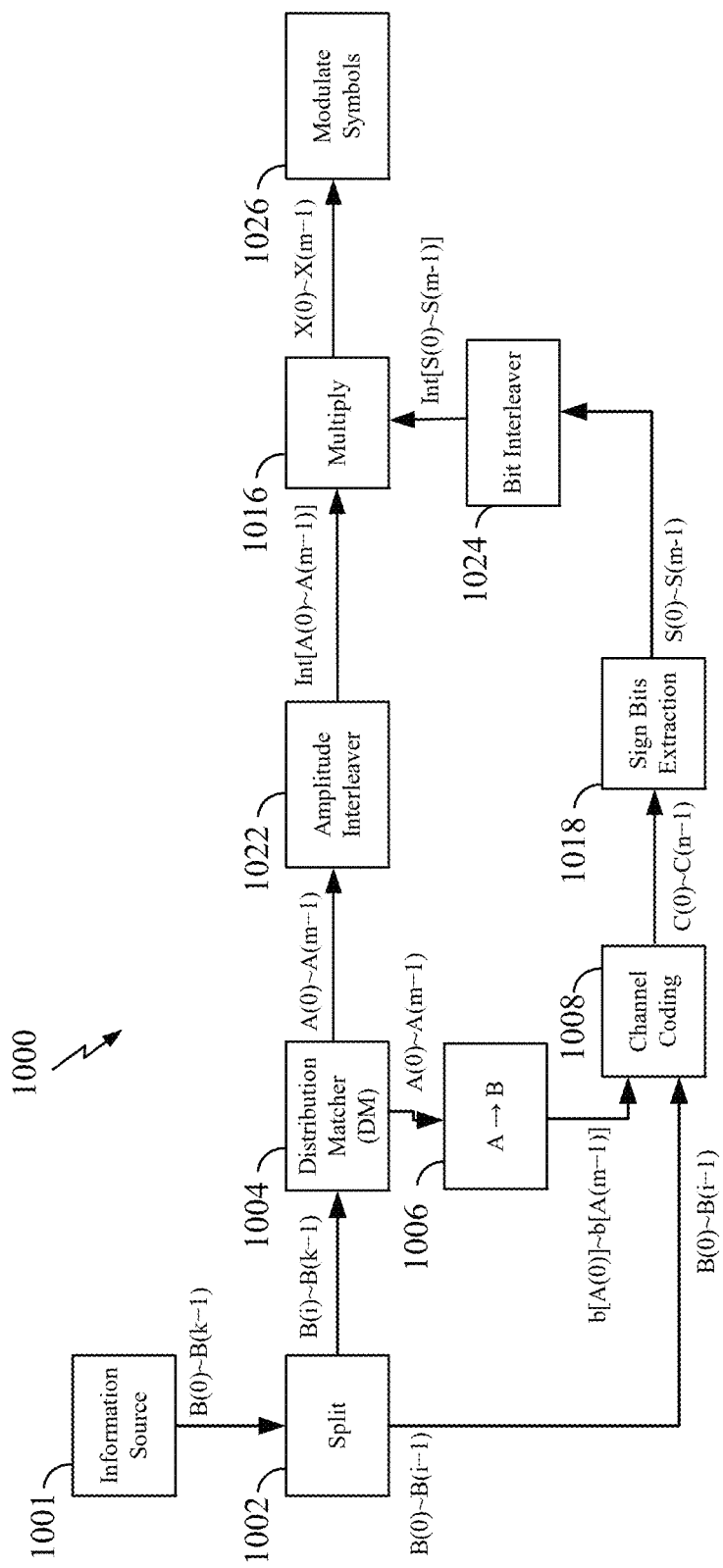
FIG. 10 is a block diagram illustrating an example of a physical layer entity of a transmitting device configured for PAS with matched amplitude-level interleaving and bit-level interleaving according to some aspects of this disclosure.

A symbol-level processing and mapping block 312 performs various functions, such as layer mapping, resource mapping, symbol-level interleaving, antenna mapping, etc. As such, a bit-level interleaver interleaves bits while a symbol-level interleaver interleaves symbols. A symbol-level interleaver may be any type of interleaver configured to interleave symbols similar to the way in which a bit-level interleaver interleaves bits as described here, but with the output being interleaved symbols rather than interleaved bits. A first sequence of symbols (e.g., symbol 1, symbol 2, etc.; or A(0)~A(m−1) of FIG. 10, provided as but one illustrative example) may be interleaved to produce a second sequence of interleaved symbols (e.g., symbol 1', symbol 2', etc.; or Int[A(0)~A(m−1)] of FIG. 10, provided as but one illustrative example). While a rectangular interleaver may be used to illustrate certain examples of bit interleaving and symbol interleaving in this disclosure, the techniques of this disclosure are not so limited, and it will be understood that other interleavers may be used to interleave bits or to interleave symbols in accordance with one or more of the various techniques of this disclosure.

An OFDM signal generator 314 generates signals for transmission over a set of one or more antennas. OFDM refers to orthogonal frequency division multiplexing. That is, an air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be essentially eliminated. OFDM channels provide for high data rates by allocating a data stream in a parallel manner across multiple subcarriers. In any case, OFDM signal generator 314 may transmit, via transceiver 104 or transceiver 108, a waveform modulated according to a sequence of symbols generated by symbol-level processing and mapping block 312.

When an apparatus transmits such a signal, the signal propagates over a noisy channel 316. As used throughout this disclosure, a "channel" generally refers to a medium through which a signal passes. Once transmitted, noise in the channel (e.g., random disturbances) can affect the signal before the signal arrives at a receiver/decoder device 318 (e.g., UE 106 or base station 102). The receiver/decoder device 318, then, attempts to process the received signal and reproduce the original information message.

According to Shannon's Coding Theorem, introduced by Claude Shannon in 1948 and well-known to those skilled in the art, there exist theoretical bounds for a channel capacity in a given channel. A channel capacity generally represents a maximum transmission rate for a given channel based on the signal-to-noise ratio (SNR). This channel capacity may be generally referred to as the "Shannon capacity."

QAM typically employs a uniform constellation map having a uniform (e.g., grid-like) distribution of symbols in the complex plane, and a uniform probability of use of constellation symbols. QAM employing uniform constellation mapping has been empirically demonstrated to be limited to an achievable capacity that fails to meet the channel capacity. A non-uniform distribution of constellation symbols, however, can improve channel performance with QAM, with an achievable capacity that better approximates or in some cases, can even essentially meet the channel capacity of the channel used to transmit an information message.

In some examples, techniques for non-uniform distribution utilizing QAM include geometric constellation shaping and/or probabilistic constellation shaping. With geometric constellation shaping, each constellation point in the complex plane is generally utilized with an equal probability, but the location of the constellation points in the complex plane is altered from the uniform grid to exhibit a generally Gaussian amplitude distribution. With probabilistic constellation shaping (PCS), also referred to in the field as probabilistic amplitude shaping (PAS), a more conventional (e.g., grid-like) uniform distribution of symbols is used in the complex plane, but with a non-equal probability of use of the respective constellation symbols. Referring to FIG. 4, one example of such a PAS constellation is shown, where the shading at each constellation point schematically represents the probability of the corresponding constellation symbol being employed for a transmission. It should be noted that, although a particular grid arrangement is shown in FIG. 4, the techniques of this disclosure are not so limited, and any number of different distribution grids may be used in various examples.

Figure 5:
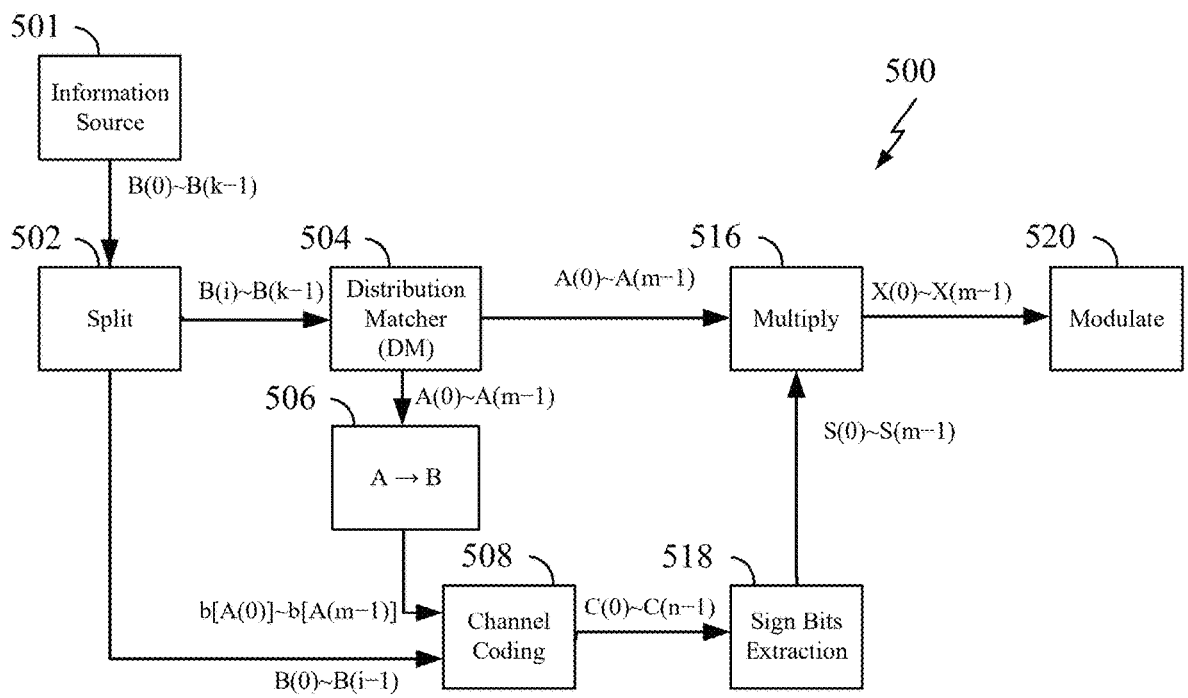
FIG. 5 is a schematic diagram illustrating an example implementation of a physical layer entity of a transmitting device configured for probabilistic amplitude shaping (PAS) according to some aspects of the disclosure.
Figure 5:
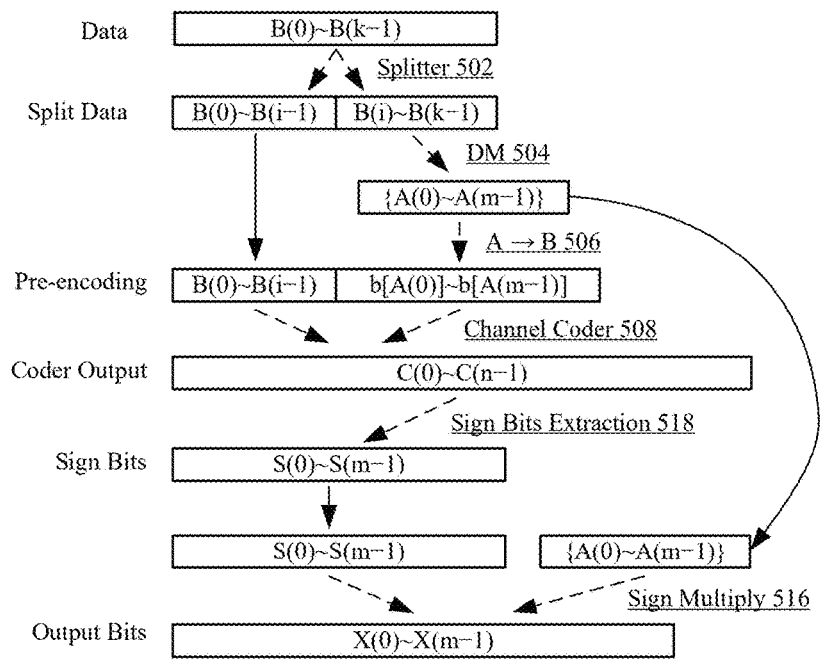

FIG. 5 is a schematic block diagram illustrating one example of a physical layer entity implementing probabilistic amplitude shaping (PAS). In the illustrated example, the functions or operations shown are performed from the point of view of a physical layer entity in a transmitting device. As shown, an information source 501 (e.g., a MAC layer or any other suitable source of information for transmission) provides a sequence of k bits of binary data B(0)~B(k−1). A split block or function 502 splits, segments, or separates this source sequence into two parts, where a first part B(i)~B(k−1) includes a sequence of (k−i) bits, and a second part B(0)~B(i−1) includes a sequence of i bits.

The first part B(i)~B(k−1) of the data is provided to a distribution matcher (DM) 504, which maps an input of (k−1) bits to an ordered sequence of (m) amplitudes A(0)~A(m−1), having the desired, nonuniform probabilities. This way, a transmitting device utilizing PAS can obtain a nonuniform probability of symbols for the constellation. That is, a DM 504 takes as an input a sequence of (k−1) uniformly distributed, independent bits or symbols, and provides as an output a sequence of (m) amplitude symbols (e.g., complex numbers) having a nonuniform distribution of amplitudes that represents the message according to the PAS technique.

In various examples, a DM may utilize any of a number of suitable algorithms and have any of a number of suitable configurations. Some examples of DMs known in the art include a constant-composition DM (CCDM), a prefix-free distribution matching DM (PCDM), a multiset-partition DM (MPDM), a product bit-level DM, a parallel-amplitude DM with subset ranking, a streaming DM, shell mapping, enumerative sphere shaping, framing of variable-length DM outputs into fixed-length blocks, a DM with mark ratio control, etc. Although the aforementioned DM techniques differ from one another, in general, a DM system generates a probabilistically determined sequence of symbols configured with an aim to employ a probabilistically shaped waveform (e.g., a QAM waveform).

The second part B(0)~B(i−1) of the data is provided to a channel coder 508 (e.g., unchanged by the DM 504). In addition, the amplitude symbol sequence A(0)~A(m−1) from the DM 504 (configured according to the PAS technique) is converted to an ordered sequence of binary bits b[A(0)]~b[A(m−1)] by an amplitude-to-binary (A→B) mapping block 506. This sequence of binary bits is also provided to the channel coder 508. In a particular example, any suitable generation of binary bit sequences based on the amplitude symbol sequence may be employed. For example, the amplitude-to-binary (A→B) mapping block 506 may employ an M-ary amplitude to binary mapping technique, which generates a sequence of $\log_2(M) \cdot m$ binary bits.

Referring now to schematic timing diagram 550, the data from the information source 501 is shown in the first row, represented by the binary sequence B(0)~B(k−1). As shown in the second row, the splitter 502 splits, separates, or segments the data into two parts; one of which, as shown in the third row, is converted to a sequence of amplitude symbols based on PAS. As shown in the fourth row, part of the split data sequence is combined with a sequence of binary bits based on the amplitude symbol sequence, providing a pre-encoding input to the channel coder 508. As discussed above, the channel coder 508 takes as an input the second part B(0)~B(i−1) of the data, and a binary sequence b[A(0)]~b[A(m−1)] corresponding to a PAS-mapped portion of the data, i.e., the first part B(i)~B(k−1) of the data. The channel coder 508 encodes this input to generate an encoded output sequence, which in some examples, may be represented by a length-n sequence of parity bits C(0)~C(n−1).

A sign bits extraction block 518 extracts a sequence of m sign bits S(0)~S(m−1) from the parity bits C(0)~C(n−1), which are provided to a sign multiply block 516, which combines the sign bits S(0)~S(m−1) with the sequence of amplitude symbols A(0)~A(m−1) from the DM 504 described above, to generate a sequence of output symbols X(0)~X(m−1). The output symbols are then modulated (e.g., according to QAM) for transmission via one or more antennas.

In a conventional wireless communication device that does not employ probabilistic amplitude shaping (PAS), coded bits are interleaved and corresponding QAM constellations are generated based on these interleaved bits. At a receiver, the constellations are de-mapped to bits and then de-interleaved to obtain the coded bits, which can thus be decoded to recover the information message or data.

However, as it can be observed from the above description of PAS in connection with FIG. 5, the order of the bits should not be changed to preserve the shaped amplitudes of the information symbols and to obtain the shaping gain from PAS. That is, a bit-level interleaver may not be supported after a channel encoder. Accordingly, one or more aspects of the present disclosure provide techniques to enable interleaving with a PAS transmission.

For example, to transmit an information message, a physical layer entity in a wireless communication device (e.g., a transmitting device) may employ a DM to determine a sequence of amplitude symbols, corresponding to the information message, configured for probabilistic amplitude shaping; and additionally generate a sequence of output symbols based on an encoded information block corresponding to the information message. As described below, several exemplary options and configurations are disclosed herein that employ interleaving of one or more of the sequence of amplitude symbols, the encoded information block, a pre-encoding information sequence based on the information message, and/or the information message (or a portion of it) itself. By employing PAS with interleaving as disclosed herein, a wireless communication device can achieve increased throughput based on shaping gain of PAS combined with increased frequency diversity & robustness in a fading channel, based on interleaving. One or more algorithms and structures disclosed herein maintain the amplitude distributions of the DM for a transmission while also providing for interleaving of the information bits.

Figure 6:
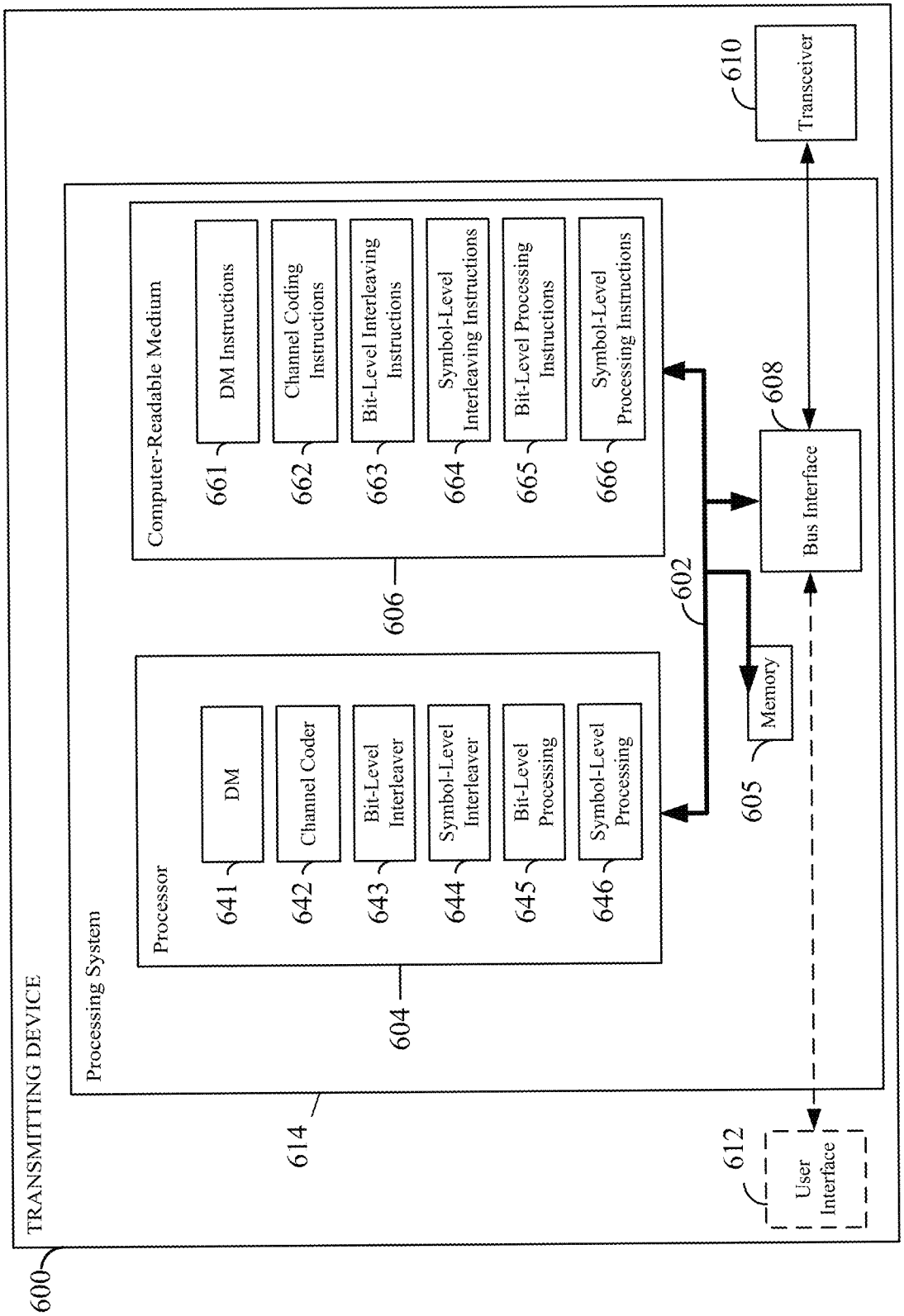
FIG. 6 is a block diagram conceptually illustrating an example of a hardware implementation for a transmitting device according to some aspects of the disclosure.

FIG. 6 is a block diagram illustrating an example of a hardware implementation for a transmitting device 600 employing a processing system 614. For example, the transmitting device 600 may be a base station 102 and/or a UE 106 shown in FIG. 1. The transmitting device 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the transmitting device 600 may be configured to perform any one or more of the functions described herein. That is, the processor 604, as utilized in a transmitting device 600, may be configured (e.g., in coordination with the memory 605) to implement any one or more of the processes and procedures described below and illustrated in FIGS. 9, 11, 13, and/or 17. Furthermore, one or more portions of the wireless communication device 600, or some combination of parts of the illustrated example, may correspond to a physical layer entity configured as described below and illustrated in FIGS. 8, 10, 12, and/or 16.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

Figure 11:
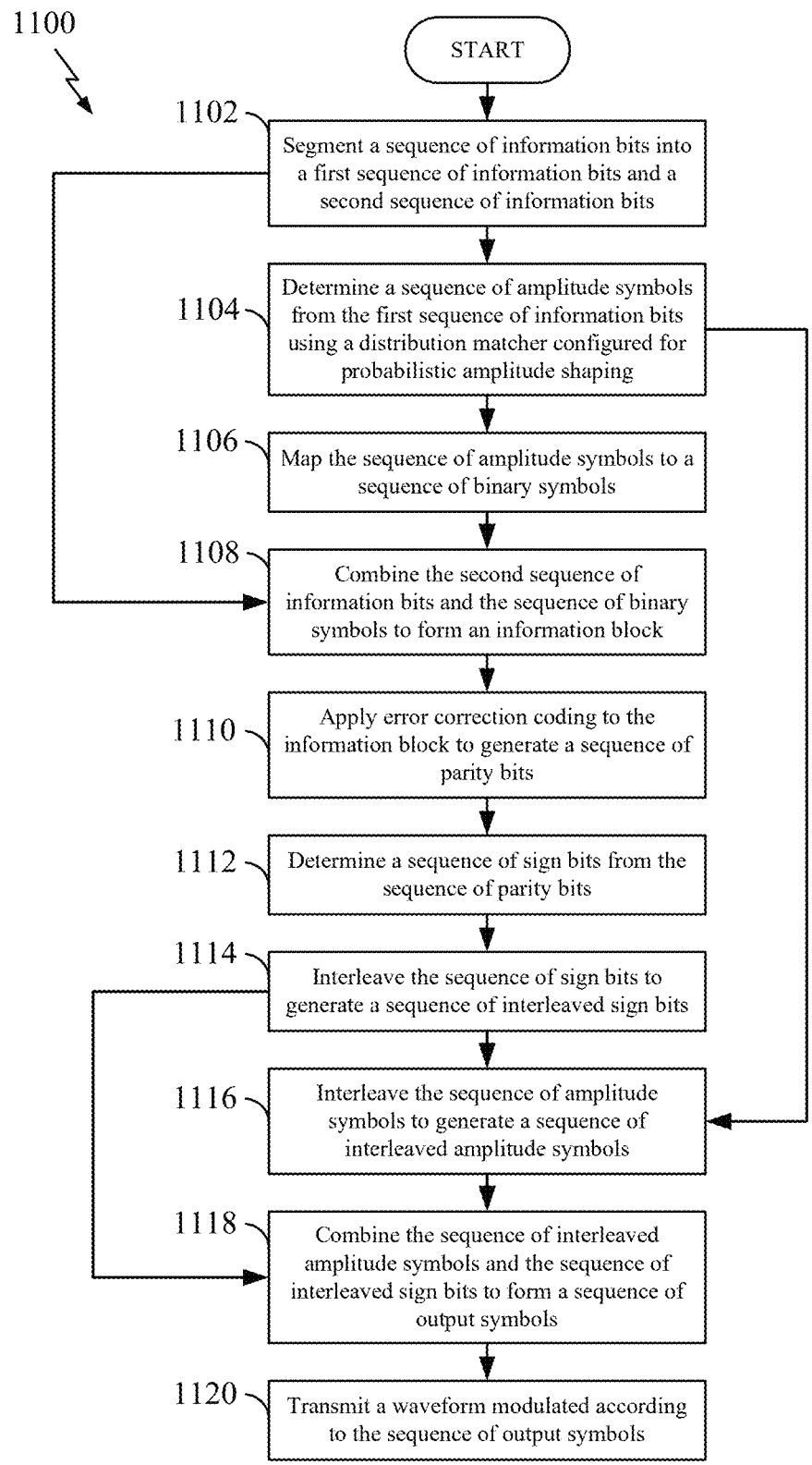
FIG. 11 is a flow chart illustrating an exemplary process for PAS with matched amplitude-level interleaving and bit-level interleaving according to some aspects of this disclosure.
Figure 13:
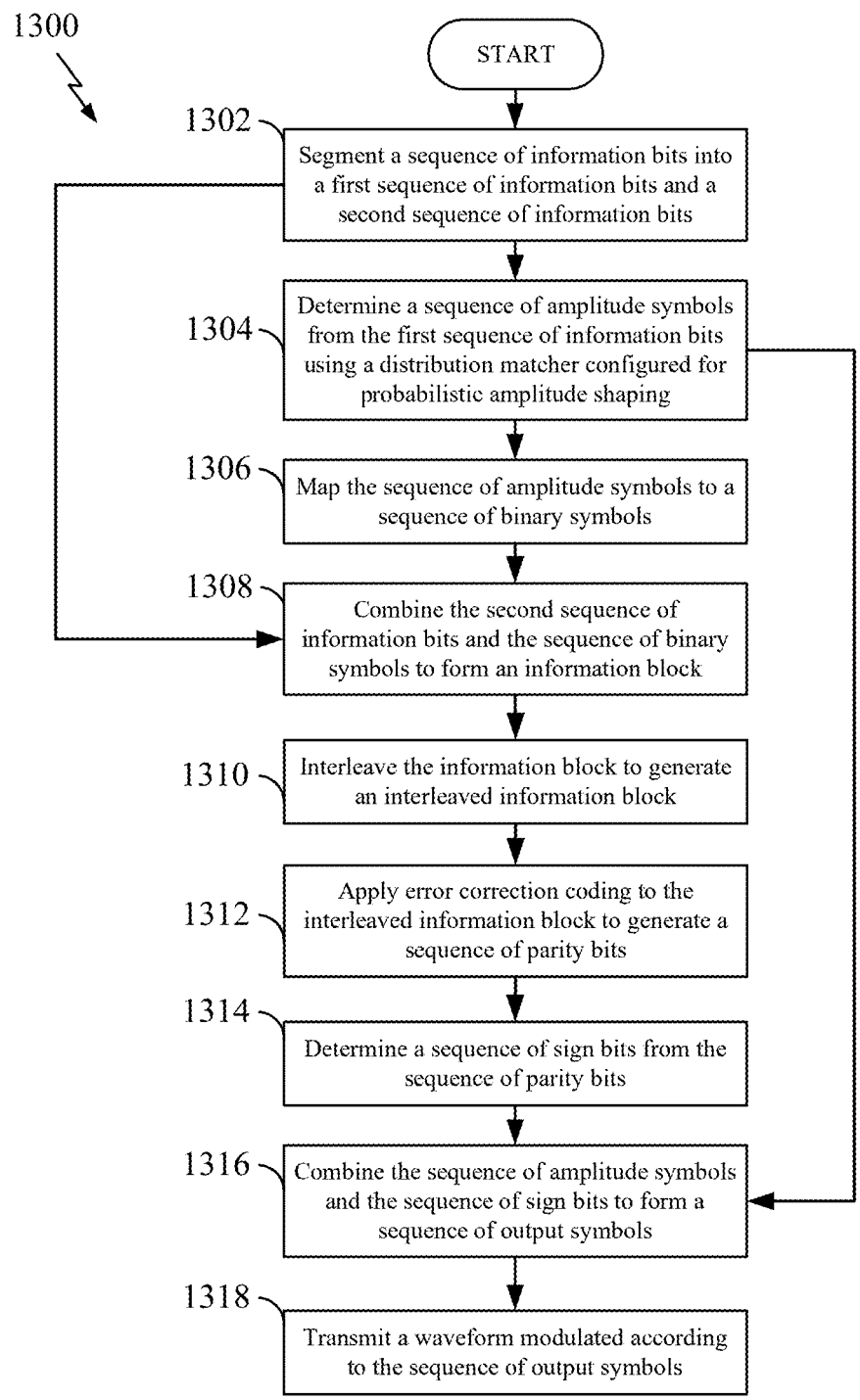
FIG. 13 is a flow chart illustrating an exemplary process for PAS with bit-level interleaving before channel coding according to some aspects of this disclosure.

In some aspects of the disclosure, the processor 604 may include distribution matching (DM) circuitry 641 configured (e.g., in coordination with the memory 605) for various functions, including, e.g., mapping a sequence of bits having a generally uniform probability distribution to a sequence of amplitude symbols having nonuniform probabilities selected according to a probabilistic amplitude shaping (PAS) technique. For example, the DM circuitry 641 may be configured to implement one or more of the functions described below in relation to FIG. 9, including, e.g., block 904; FIG. 11, including, e.g., block 1104; FIG. 13, including, e.g., block 1304; and/or FIG. 17, including, e.g., block 1704.

In a further aspect of the disclosure, the processor 604 may include channel coding circuitry 642 configured (e.g., in coordination with the memory 605) for various functions, including, e.g., applying error correction coding (forward error correction, channel coding, etc.) to an input sequence. Channel coding circuitry 642 may be configured for any one or more suitable coding algorithms, such as LDPC, Polar codes, turbo codes, etc. In some examples, the channel coding circuitry 642 may generate a sequence of encoded output bits; and in some examples, the channel coding circuitry 642 may generate a sequence of parity bits or sign bits. For example, the channel coding circuitry 642 may be configured to implement one or more of the functions described below in relation to FIG. 9, including, e.g., block 910 and/or 912; FIG. 11, including, e.g., block 1110 and/or 1112; FIG. 13, including, e.g., block 1312 and/or 1314; and/or FIG. 17, including, e.g., block 1708.

In a further aspect of the disclosure, the processor 604 may include bit-level interleaving circuitry 643 configured (e.g., in coordination with the memory 605) for various functions, including, e.g., interleaving a sequence of bits (information bits, sign bits, or any other suitable sequence of bits). The bit-level interleaving circuitry 643 may utilize any suitable interleaving algorithm including but not limited to rectangular interleaving, triangular interleaving, random interleaving, or any other suitable form or configuration for a bit-level interleaver. For example, the bit-level interleaving circuitry 643 may be configured to implement one or more of the functions described below in relation to FIG. 11, including, e.g., block 1114; FIG. 13, including, e.g., block 1310; and/or FIG. 17, including, e.g., block 1710.

In a further aspect of the disclosure, the processor 604 may include symbol-level interleaving circuitry 644 configured (e.g., in coordination with the memory 605) for various functions, including, e.g., interleaving a sequence of symbols (e.g., amplitude symbols) or any other suitable sequence of symbols, which may or may not be represented by a sequence of complex numbers. The symbol-level interleaving circuitry 644 may utilize any suitable interleaving algorithm including but not limited to rectangular interleaving, triangular interleaving, random interleaving, or any other suitable form or configuration for a symbol-level interleaver. For example, the symbol-level interleaving circuitry 644 may be configured to implement one or more of the functions described below in relation to FIG. 9, including, e.g., block 916; FIG. 11, including, e.g., block 1116; and/or FIG. 17, including, e.g., block 1710.

In a further aspect of the disclosure, the processor 604 may include bit-level processing circuitry 645 configured (e.g., in coordination with the memory 605) for various functions related to bit manipulation or processing in relation to a given sequence of bits, including, e.g., scrambling, interleaving, segmentation, assembly, sign bits determination, etc. For example, the bit-level processing circuitry 645 may be configured to implement one or more of the functions described below in relation to FIG. 9, including, e.g., block 902, 904, 906, 908, 912, and/or 914; FIG. 11, including, e.g., block 1102, 1104, 1106, 1108, 1112, 1114, and/or 1118; block 1302, 1304, 1306, 1308, 1310, 1314, and/or 1316; and/or FIG. 17, including, e.g., block 1702, 1704, 1706, and/or 1710.

In a further aspect of the disclosure, the processor 604 may include symbol-level processing circuitry 646 configured (e.g., in coordination with the memory 605) for various functions related to symbol manipulation or processing in relation to a given sequence of symbols, including, e.g., amplitude-to-binary (A→B) mapping, interleaving, sign multiplication, etc. For example, the symbol-level processing circuitry 646 may be configured to implement one or more of the functions described below in relation to FIG. 9, including, e.g., block 904, 906, 914, and/or 916; FIG. 11, including, e.g., block 1104, 1106, 1116, and/or 1118; FIG. 13, including, e.g., block 1304, 1306, and/or 1316; and/or FIG. 17, including, e.g., block 1704, 1706, and/or 1710.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may store computer-executable code that includes distribution matching (DM) instructions 661 that configure a transmitting device 600 for various functions, including, e.g., mapping a sequence of bits having a generally uniform probability distribution to a sequence of amplitude symbols having nonuniform probabilities selected according to a probabilistic amplitude shaping (PAS) technique. For example, the DM instructions 661 may be configured to implement one or more of the functions described below in relation to FIG. 9, including, e.g., block 904; FIG.

11, including, e.g., block 904; FIG. 11, including, e.g., block 1104; FIG. 13, including, e.g., block 1304; and/or FIG. 17, including, e.g., block 1704.

In a further aspect of the disclosure, the computer-readable storage medium 606 may store computer-executable code that includes channel coding instructions 662 that configure a transmitting device 600 for various functions, including, e.g., applying error correction coding (forward error correction, channel coding, etc.) to an input sequence. Channel coding instructions 662 may be configured for any one or more suitable coding algorithms, such as LDPC, Polar codes, turbo codes, etc. In some examples, the channel coding instructions 662 may generate a sequence of encoded output bits; and in some examples, the channel coding instructions 662 may generate a sequence of parity bits or sign bits. For example, the channel coding instructions 662 may be configured to implement one or more of the functions described below in relation to FIG. 9, including, e.g., block 910 and/or 912; FIG. 11, including, e.g., block 1110 and/or 1112; FIG. 13, including, e.g., block 1312 and/or 1314; and/or FIG. 17, including, e.g., block 1708.

In a further aspect of the disclosure, the computer-readable storage medium 606 may store computer-executable code that includes bit-level interleaving instructions 663 that configure a transmitting device 600 for various functions, including, e.g., interleaving a sequence of bits (information bits, sign bits, or any other suitable sequence of bits). The bit-level interleaving instructions 663 may utilize any suitable interleaving algorithm including but not limited to rectangular interleaving, triangular interleaving, random interleaving, or any other suitable form or configuration for a bit-level interleaver. For example, the bit-level interleaving instructions 662 may be configured to implement one or more of the functions described below in relation to FIG. 11, including, e.g., block 1114; FIG. 13, including, e.g., block 1310; and/or FIG. 17, including, e.g., block 1710.

In a further aspect of the disclosure, the computer-readable storage medium 606 may store computer-executable code that includes symbol-level interleaving instructions 664 that configure a transmitting device 600 for various functions, including, e.g., interleaving a sequence of symbols (e.g., amplitude symbols) or any other suitable sequence of symbols, which may or may not be represented by a sequence of complex numbers. The symbol-level interleaving instructions 664 may utilize any suitable interleaving algorithm including but not limited to rectangular interleaving, triangular interleaving, random interleaving, or any other suitable form or configuration for a symbol-level interleaver. For example, the symbol-level interleaving instructions 664 may be configured to implement one or more of the functions described below in relation to FIG. 9, including, e.g., block 904; FIG. 11, including, e.g., block 916; FIG. 11, including, e.g., block 1116; and/or FIG. 17, including, e.g., block 1710.

In a further aspect of the disclosure, the computer-readable storage medium 606 may store computer-executable code that includes bit-level processing instructions 665 that configure a transmitting device 600 for various functions related to bit manipulation in relation to a given sequence of bits, including, e.g., scrambling, interleaving, segmentation, assembly, sign bits determination, etc. For example, the bit-level processing instructions 665 may be configured to implement one or more of the functions described below in relation to FIG. 9, including, e.g., block 902, 904, 906, 908, 912, and/or 914; FIG. 11, including, e.g., block 1102, 1104, 1106, 1108, 1112, 1114, and/or 1118; FIG. 13, including, e.g., block 1302, 1304, 1306, 1308, 1310, 1314, and/or 1316; and/or FIG. 17, including, e.g., block 1702, 1704, 1706, and/or 1710.

In a further aspect of the disclosure, the computer-readable storage medium 606 may store computer-executable code that includes symbol-level processing instructions 666 that configure a transmitting device 600 for various functions related to symbol manipulation or processing in relation to a given sequence of symbols, including, e.g., amplitude-to-binary (A→B) mapping, interleaving, sign multiplication, etc. For example, the symbol-level processing instructions 666 may be configured to implement one or more of the functions described below in relation to FIG. 9, including, e.g., block 904, 906, 914, and/or 916; FIG. 11, including, e.g., block 1104, 1106, 1116, and/or 1118; FIG. 13, including, e.g., block 1304, 1306, and/or 1316; and/or FIG. 17, including, e.g., block 1704, 1706, and/or 1710.

In one configuration, the apparatus 600 for wireless communication includes means for determining a sequence of amplitude symbols according to probabilistic amplitude shaping; means for applying error correction coding to encode an information block; means for interleaving a sequence of bits (e.g., bit-level interleaving); means for interleaving a sequence of symbols (e.g., symbol-level interleaving); means for bit-level processing, and means for symbol-level processing. In one aspect, the aforementioned means may be the processor(s) 604 shown in FIG. 6 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIGS. 1, 2, 3, 5, 8, 10, 12, and/or 16, and utilizing, for example, the processes and/or algorithms described herein in relation to FIGS. 5, 9, 11, 13, and/or 17.

Figure 7:
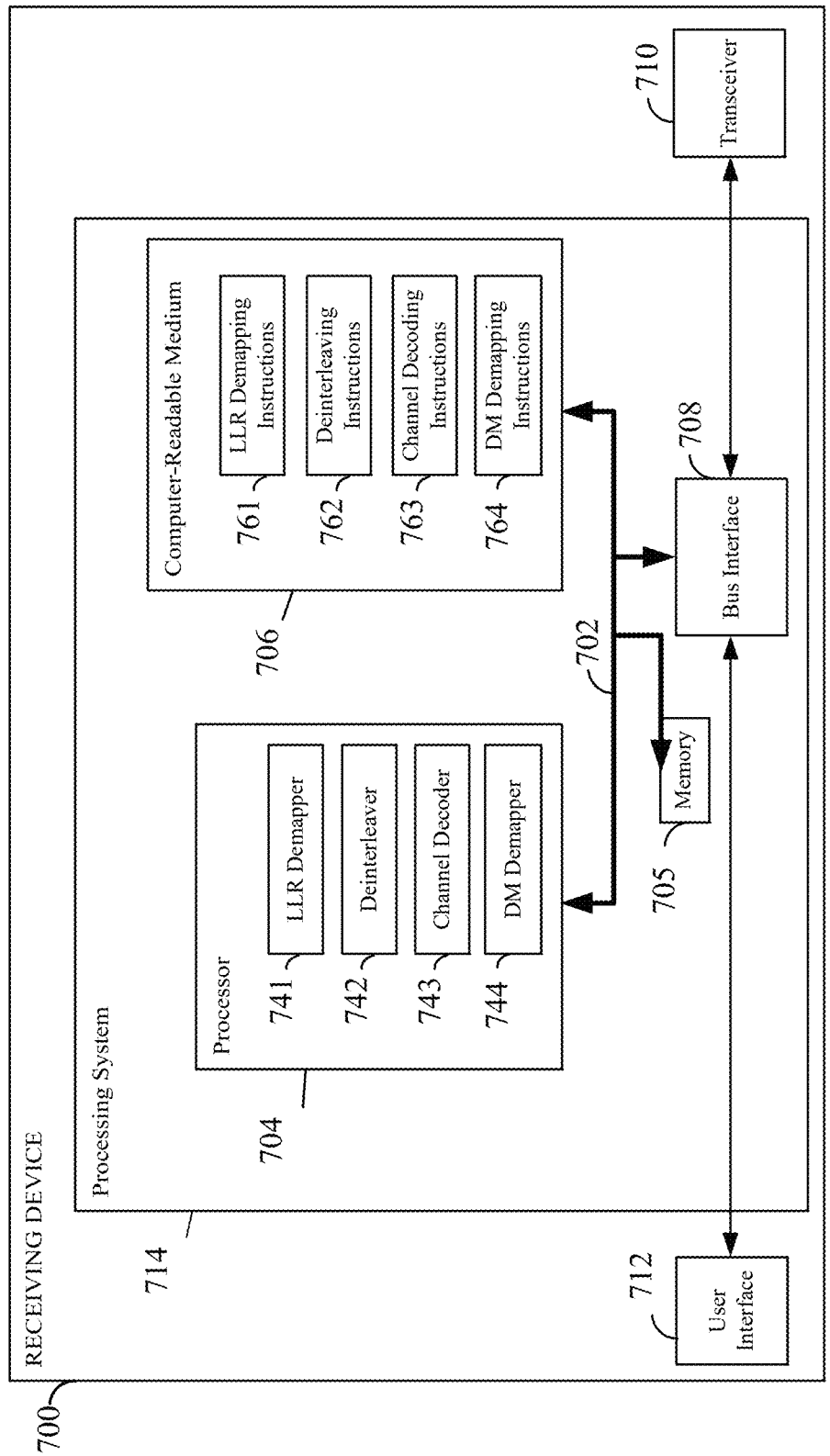
FIG. 7 is a block diagram conceptually illustrating an example of a hardware implementation for a receiving device according to some aspects of this disclosure.

FIG. 7 is a conceptual diagram illustrating an example of a hardware implementation for an exemplary receiving device 700 employing a processing system 714. In accordance with various aspects of the disclosure, an element, or any portion of an element, or any combination of elements may be implemented with a processing system 714 that includes one or more processors 704. For example, the receiving device 700 may be a base station 102 and/or a UE 106 as illustrated in FIG. 1.

The processing system 714 may be substantially the same as the processing system 614 illustrated in FIG. 6, including a bus interface 708, a bus 702, memory 705, a processor 704, and a computer-readable medium 706. Furthermore, the receiving device 700 may include a user interface 712 and a transceiver 710 substantially similar to those described above in FIG. 6. That is, the processor 704, as utilized in a receiving device 700, may be configured (e.g., in coordination with the memory 705) to implement any one or more of the processes described below and illustrated in FIGS. 14 and/or 15.

In some aspects of the disclosure, the processor 704 may include LLR demapping circuitry 741 configured (e.g., in coordination with the memory 704) for various functions, including, for example, generating a log likelihood ratio estimate of a received symbol sequence. The processor 704 may further include bit deinterleaving circuitry 742 configured (e.g., in coordination with the memory 704) for various functions, including, for example, deinterleaving a sequence of LLRs corresponding to an estimate of a received symbol sequence. The processor 704 may further include channel decoding circuitry 743 configured (e.g., in coordination with the memory 704) for various functions, including, for example, decoding a sequence of LLRs corresponding to an estimate of a received symbol sequence. The processor 704 may further include DM demapping circuitry 744 configured (e.g., in coordination with the memory 704) for various functions, including, for example, demapping a sequence of constellation-shaped symbols to recover an information message.

And further, the computer-readable storage medium 706 may store computer-executable code that includes LLR demapping instructions 761 that configure a receiving device 700 for various functions, including, e.g., generating a log likelihood ratio estimate of a received symbol sequence. The computer-readable storage medium 706 may further store computer-executable code that includes bit deinterleaving instructions 762 configured (e.g., in coordination with the memory 705) for various functions, including, for example, deinterleaving a sequence of LLRs corresponding to an estimate of a received symbol sequence. The computer-readable storage medium 706 may store computer-executable code that includes channel decoding instructions 763 configured (e.g., in coordination with the memory 705) for various functions, including, for example, decoding a sequence of LLRs corresponding to an estimate of a received symbol sequence. The computer-readable storage medium 706 may store computer-executable code that includes DM demapping instructions 764 configured (e.g., in coordination with the memory 705) for various functions, including, for example, demapping a sequence of constellation-shaped symbols to recover an information message.

In one configuration, the apparatus 700 for wireless communication includes means for LLR demapping, means for deinterleaving, means for channel decoding, and means for DM demapping. In one aspect, the aforementioned means may be the processor 704 shown in FIG. 7 configured to perform the functions recited by the aforementioned means. In another aspect, the aforementioned means may be a circuit or any apparatus configured to perform the functions recited by the aforementioned means.

Figure 15:
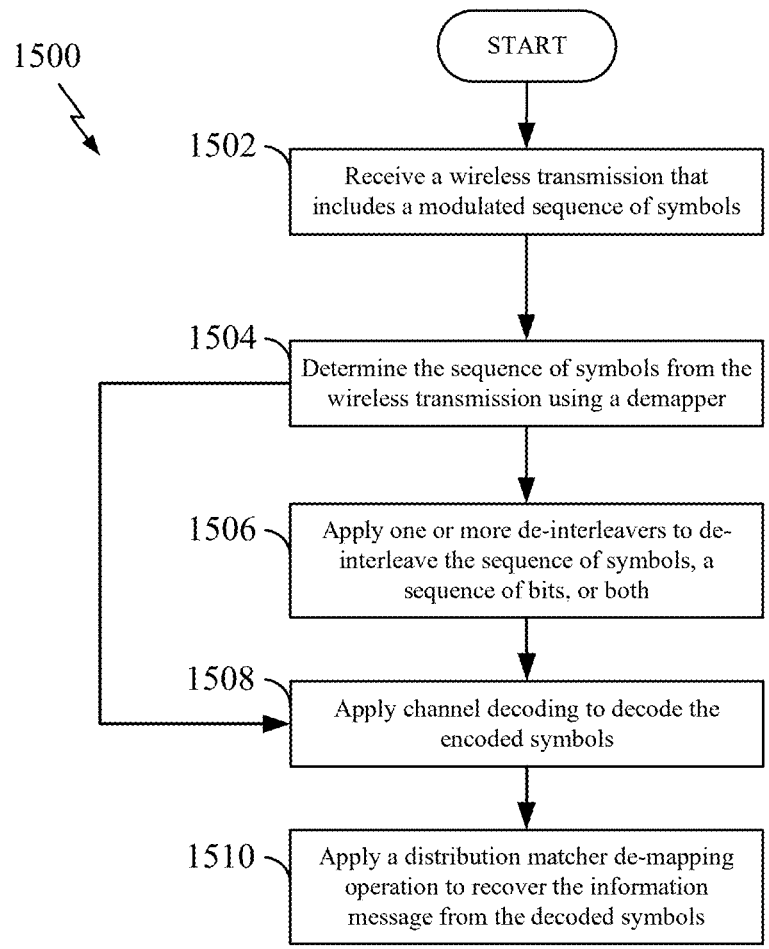
FIG. 15 is a flow chart illustrating an exemplary process for receiving a PAS waveform configured according to FIGS. 12-13, according to some aspects of this disclosure according to some aspects of this disclosure.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1 and/or 14, and utilizing, for example, the processes and/or algorithms described herein in relation to FIG. 15.

Symbol-Level Interleaver

In one aspect, this disclosure provides for a symbol-level interleaver, where a sequence of output symbols is provided to an interleaver after DM and channel coding, and before modulation for transmission. In this manner, a sequence of shaped symbols can maintain its shaping gain while interleaving the shaped symbols prior to transmission.

Figure 8:
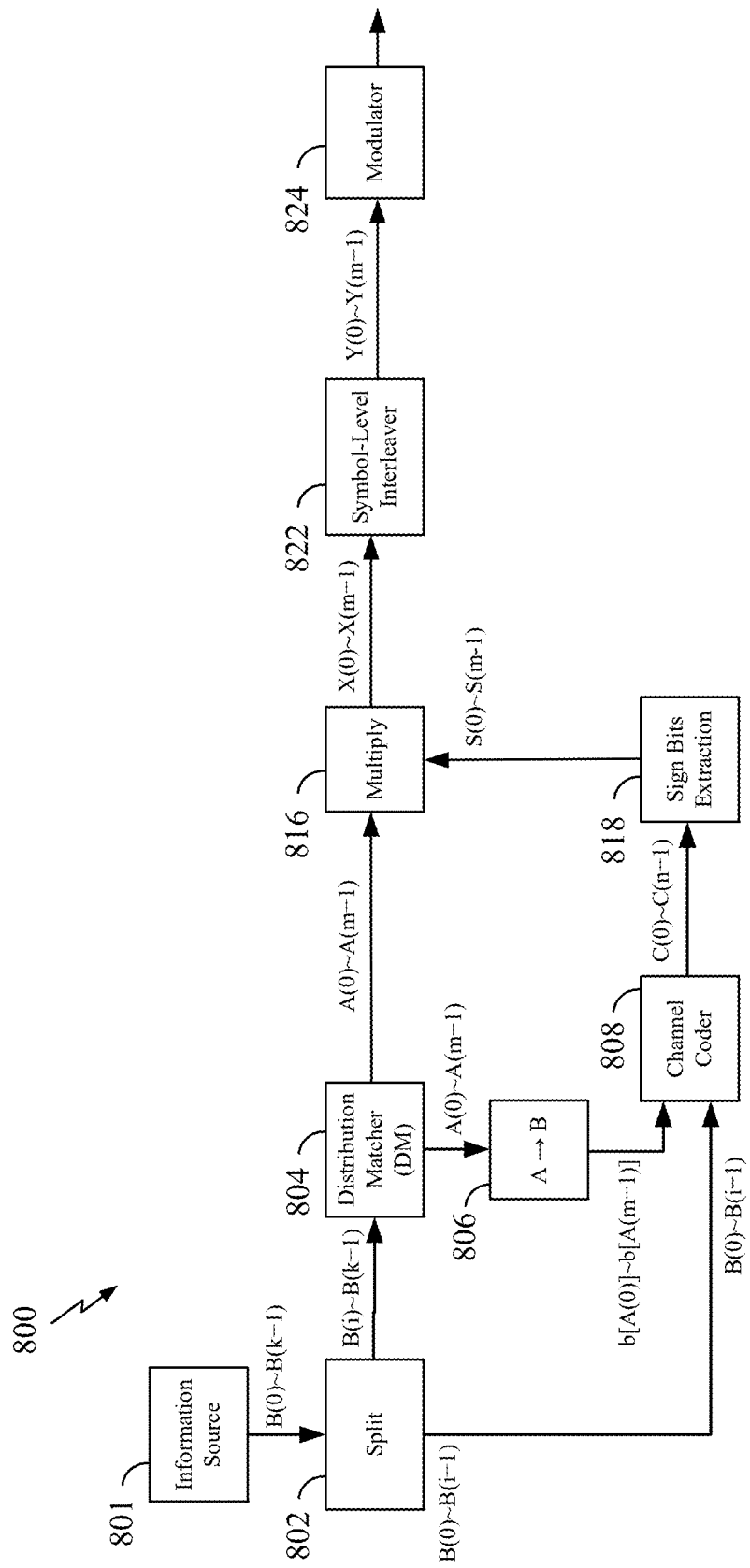
FIG. 8 is a block diagram illustrating an example of a physical layer entity of a transmitting device configured for PAS with symbol-level interleaving according to some aspects of this disclosure.

FIG. 8 is a schematic block diagram illustrating an exemplary structure or technique for interleaving an information message with constellation-shaped modulation according to some aspects of this disclosure. In the illustrated example, the functions or operations shown are performed from the point of view of a physical layer entity in a transmitting device (e.g., the transmitting device 600 described above and illustrated in FIG. 6). For example, an encoder, which may include probabilistic signal shaping and interleaving features, may be configured to implement the process illustrated in FIG. 9.

Figure 9:
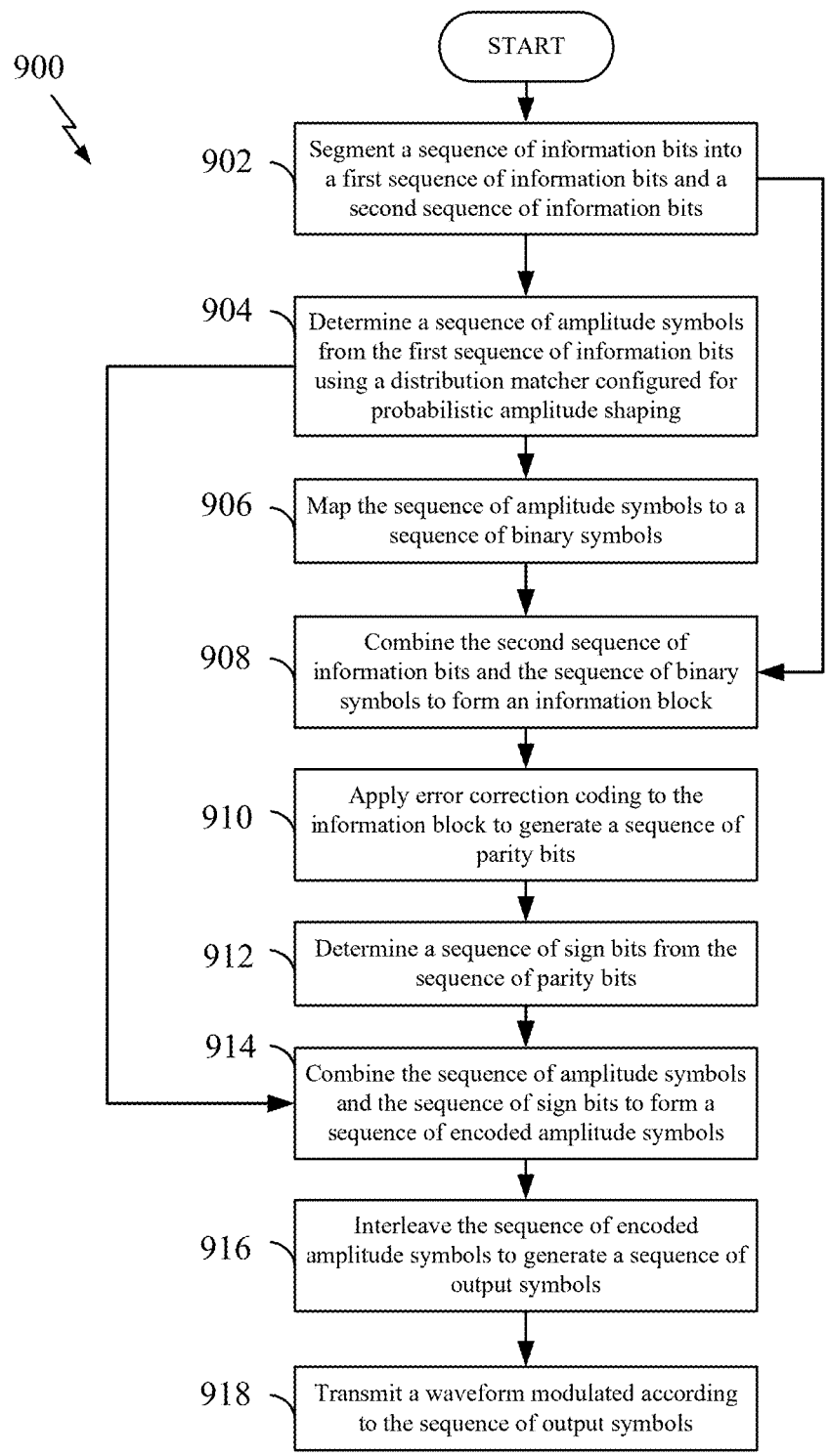
FIG. 9 is a flow chart illustrating an exemplary process for PAS with symbol-level interleaving according to some aspects of this disclosure.

FIG. 9 is a flow chart illustrating an exemplary process 900 for interleaving an information message with constellation-shaped modulation in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the transmitting device 600 illustrated in FIG. 6, e.g., employing circuitry and/or software configured according to the block diagram illustrated in FIG. 8. (In the description of the process 900 that follows, reference is made to the block diagram 800 illustrated in FIG. 8 for convenience of description.) In some examples, the process 900 may be carried out by any suitable apparatus or means for carrying out the functions or algorithm described below.

At block 902, a transmitting device may segment a sequence of information bits into a first sequence of information bits and a second sequence of information bits. For example, a physical layer entity at a transmitting device may receive an information message from an information source 801, which can be a MAC sublayer, an application sublayer, or any other suitable source of information messages for transmission. In FIG. 8, the information message from the information source 801 is a sequence B that includes k bits, denoted $B(0){\sim}B(k-1)$, where k>0 is an integer. As illustrated, split block or function 802 segments, splits, or separates the sequence of information bits $B(0){\sim}B(k-1)$ into a first sequence of information bits $B(i){\sim}B(k-1)$, including a sequence of (k−i) bits, and a second sequence of information bits $B(0){\sim}B(i-1)$, including a sequence of i bits, where i is an integer and $0 \leq i \leq k$. By virtue of this segmentation, various operations may be applied differently for different portions of an information sequence as described with reference to various examples of this disclosure. In various examples, a sequence of information bits may be segmented into two, three, or more sequences. In addition, the sequence of information bits may include a particular sequence of information bits that make up a portion or subset of a wider sequence. In such examples, the wider sequence of information bits may be segmented into three or more parts, where the parts include at least a first sequence of information bits and a second sequence of information bits.

At block 904, a transmitting device may determine a sequence of amplitude symbols from the first sequence of information bits using a distribution matcher configured for probabilistic amplitude shaping (PAS). For example, as shown in FIG. 8, the first sequence of information bits $B(i){\sim}B(k-1)$ may be provided to a distribution matcher (DM) 804. The DM 804 may then map its input sequence to an ordered amplitude sequence $A(0){\sim}A(m-1)$ corresponding to a sequence of m probabilistically-shaped amplitude symbols, where m>0 is an integer. For example, in a transmitting device that employs quadrature amplitude modulation (QAM), the sequence of amplitude symbols $A(0){\sim}A(m-1)$ may correspond to a sequence of complex numbers, where $A(j) \in \mathbb{C}$ for all values of j. As an example, the DM 804 may select a suitable amplitude $|A(j)|$ for each symbol of the sequence $A(0){\sim}A(m-1)$ to achieve a desired probabilistically shaped constellation of QAM symbols.

At block 906, the transmitting device may map the sequence of amplitude symbols to a sequence of binary symbols. For example, as shown in FIG. 8, the amplitude sequence A(0)~A(m−1) is provided to an amplitude-to-binary (A→B) mapping block 806. As used herein, the process of "amplitude-to-binary (A→B) mapping" may be referred to as "A2B mapping," or at times, simply as "A2B," which, in any event, may be implemented by an A2B mapper, such as by symbol-level processing circuitry 646 in the transmitting device 600 described above. At A2B block 806, an A2B mapper may then apply a suitable b(function to map the sequence of amplitude symbols to a binary sequence b[A(0)]~b[A(m−1)]. The binary sequence, also referred to herein as a sequence of binary symbols, may then be provided to channel coder 808. And in some examples, the second sequence of information bits B(0)~B(i−1) may be provided directly to the channel coder 808.

At block 908, the transmitting device may combine the second sequence of information bits and the sequence of binary symbols to form an information block. For example, the second sequence of information bits B(0)~B(i−1) may be concatenated with the sequence of binary symbols b[A(0)]~b[A(m−1)] to generate a combined sequence, although any suitable combination of the respective sets may be utilized without altering the principle of operation. In the example provided, the second sequence of information bits B(0)~B(i−1) provides a sequence not subject to probabilistic amplitude shaping by the DM 804, while the sequence of binary symbols b[A(0)]~b[A(m−1)] provides a sequence modified according to probabilistic amplitude shaping. Some examples may employ such a paradigm, for example, for applying PAS to only certain portions of data for transmission, such as systematic bits.

At block 910, the transmitting device may apply error correction coding to the information block to generate a sequence of parity bits. For example, channel coder 808 may encode its pre-encoding input (e.g., an information block corresponding to a combination of the second sequence of information bits B(0)~B(i−1) and the sequence of binary symbols b[A(0)]~b[A(m−1)]) to generate an encoded output sequence C(0)~C(n−1). Any suitable systematic or non-systematic error correction code may be utilized, including but not limited to LDPC, polar codes, turbo codes, etc.

At block 912, the transmitting device may determine a sequence of sign bits from the sequence of parity bits. For example, a sign bits extraction block 818 may extract a sequence of m sign bits S(0)~S(m−1) from the parity bits C(0)~C(n−1), which are provided to a sign multiply block 816. The sign bits may be represented in any suitable fashion, including but not limited to being represented by a most significant bit (MSB) in a two's complement configuration.

At block 914, the transmitting device may combine the sequence of amplitude symbols and the sequence of sign bits to form a sequence of encoded amplitude symbols. For example, a sign multiply block 816 may multiply each amplitude value by each corresponding sign value in a one-by-one manner across the entire m-length sequence to generate a sequence of encoded amplitude symbols X(0)~X(m−1).

At block 916, the transmitting device may interleave the sequence of encoded amplitude symbols to generate a sequence of output symbols. For example, a symbol-level interleaver 822 may interleave the encoded amplitude symbols X(0)~X(m−1) to generate a sequence of output symbols Y(0)~Y(m−1). The interleaver can be, e.g., a rectangular interleaver, triangular interleaver, random interleaver, or any other suitable form or configuration for a symbol-level interleaver. Broadly, the symbol-level interleaver 822 may create a suitable set of permutations of its input values to interleave the input symbols prior to modulation and transmission.

In some examples, symbol-level interleavers interleave symbols as a whole (e.g., as data words). In an example, symbol-level interleaver 822 may interleave blocks of bits as symbols (e.g., data words) with other symbols within a sequence of symbols. In an example, a symbol-level interleaver may interleave at least a first symbol (e.g., a first data word) with at least a second symbol (e.g., a second data word), wherein the at least one first symbol and the at least one second symbol represent at least part of an encoded output from DM 804. As described with reference to FIG. 10, when a symbol-level interleaver is used prior to encoding the symbols (e.g., prior to block 816), a bit-level interleaver is to be employed to interleave a sequence of bits following channel coder 808 (not shown in FIG. 8). A bit-level interleaver may further be used prior to the channel coder (as described with reference 12), in addition to or alternatively to other bit-level or symbol-level interleavers. It should be understood that the bit-level and symbol-level interleavers of FIGS. 18A-18C may be used alone or together in a chain of interleavers according to various examples of this disclosure (e.g., according to examples described with reference to FIGS. 10, 12, 14, 16, etc.).

At block 918, the transmitting device may transmit a waveform modulated according to the sequence of output symbols. For example, a modulator 824 may generate a sequence of modulated symbols for transmission over one or more antennas by applying QAM (or any other suitable modulation scheme) to the sequence of output symbols Y(0)~Y(m−1). A transmitter (e.g., the transceiver 610 of the transmitting device 600) may then transmit a waveform based on the modulated symbols utilizing any suitable wireless transmission system.

Symbol-Level Interleaver and Bit-Level Interleaver

In another aspect, this disclosure provides for separate interleaving of amplitude symbols as generated by a DM, and sign bits corresponding to channel coding. That is, in some examples, a transmitting device may employ probabilistic amplitude shaping by utilizing two interleavers: one for the shaped amplitude part, and the other to the sign bits part. By splitting the information to these separate interleavers, the interleaving operation applied to the amplitude symbol can correlate to the values of the amplitude symbols being interleaved, potentially providing for improved interleaving performance.

FIG. 10 is a schematic block diagram illustrating another exemplary structure or technique for interleaving an information message with constellation-shaped modulation according to some aspects of this disclosure. In the illustrated example, the functions or operations shown are performed from the point of view of a physical layer entity in a transmitting device (e.g., the transmitting device 600 described above and illustrated in FIG. 6). For example, an encoder, which may include probabilistic signal shaping and interleaving features, may be configured to implement the process illustrated in FIG. 11.

FIG. 11 is a flow chart illustrating an exemplary process 1100 for interleaving an information message with constellation-shaped modulation in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the transmitting device 600 illustrated in FIG. 6, e.g., employing circuitry and/or software configured according to the block diagram illustrated in FIG. 10. (In the description of the process 1100 that follows, reference is made to the block diagram 1000 illustrated in FIG. 10 for convenience of description.) In some examples, the process 1100 may be carried out by any suitable apparatus or means for carrying out the functions or algorithm described below.

At block 1102, a transmitting device may segment a sequence of information bits into a first sequence of information bits and a second sequence of information bits. For example, a physical layer entity at a transmitting device may receive an information message from an information source 1001, which can be any suitable source of information messages for transmission. In FIG. 10, the information message from the information source 1001 is a sequence B that includes k bits, denoted B(0)~B(k−1), where k>0 is an integer. As illustrated, split block or function 1002 segments, splits, or separates the sequence of information bits B(0)~B(k−1) into a first sequence of information bits B(i)~B(k−1), including a sequence of (k−i) bits, and a second sequence of information bits B(0)~B(i−1), including a sequence of i bits, where i is an integer and 0≤i≤k.

At block 1104, a transmitting device may determine a sequence of amplitude symbols from the first sequence of information bits using a distribution matcher configured for probabilistic amplitude shaping (PAS). For example, as shown in FIG. 10, the first sequence of information bits B(i)~B(k−1) may be provided to a distribution matcher (DM) 1004. The DM 1004 may map its input sequence to an ordered amplitude sequence A(0)~A(m−1) corresponding to a sequence of m probabilistically-shaped amplitude symbols, where m>0 is an integer. For example, in a transmitting device that employs quadrature amplitude modulation (QAM), the sequence of amplitude symbols A(0)~A(m−1) may correspond to a sequence of complex numbers, where $A(j) \in \mathbb{C}$ for all values of j. As an example, the DM 1004 may select a suitable amplitude |A(j)| for each symbol of the sequence A(0)~A(m−1) to achieve a desired probabilistically shaped constellation of QAM symbols.

At block 1106, the transmitting device may map the sequence of amplitude symbols to a sequence of binary symbols. For example, as shown in FIG. 10, the amplitude sequence A(0)~A(m−1) is provided to an amplitude-to-binary (A→B) mapping block 1006. At A2B block 1006, an A2B mapper may then apply a suitable b( ) function to map the sequence of amplitude symbols to a binary sequence b[A(0)]~b[A(m−1)]. The binary sequence, also referred to herein as a sequence of binary symbols, may then be provided to channel coder 808. And in some examples, the second sequence of information bits B(0)~B(i−1) may be provided directly to the channel coder 1008.

At block 1108, the transmitting device may combine the second sequence of information bits and the sequence of binary symbols to form an information block. For example, the second sequence of information bits B(0)~B(i−1) may be concatenated with the sequence of binary symbols b[A(0)]~b[A(m−1)] to generate a combined sequence, although any suitable combination of the respective sets may be utilized without altering the principle of operation.

At block 1110, the transmitting device may apply error correction coding to the information block to generate a sequence of parity bits. For example, channel coder 1008 may encode its pre-encoding input (e.g., an information block corresponding to a combination of the second sequence of information bits B(0)~B(i−1) and the sequence of binary symbols b[A(0)]~b[A(m−1)]) to generate an encoded output sequence C(0)~C(n−1). Any suitable systematic or non-systematic error correction code may be utilized, including but not limited to LDPC, polar codes, turbo codes, etc.

At block 1112, the transmitting device may determine a sequence of sign bits from the sequence of parity bits. For example, a sign bits extraction block 1018 may extract a sequence of m sign bits S(0)~S(m−1) from the parity bits C(0)~C(n−1). The sign bits may be represented in any suitable fashion, including but not limited to being represented by a most significant bit (MSB) in a two's complement configuration.

At block 1114, the transmitting device may interleave the sequence of sign bits to generate a sequence of interleaved sign bits. For example, a bit-level interleaver 1024 may interleave the sequence of sign bits S(0)~S(m−1) to generate a sequence of interleaved sign bits Int[S(0)~S(m−1)].

At block 1116, the transmitting device may interleave the sequence of amplitude symbols to generate a sequence of interleaved amplitude symbols. For example, an amplitude sequence interleaver or symbol-level interleaver 1022 may interleave the amplitude symbols A(0)~A(m−1) to generate a sequence of interleaved amplitude symbols Int[A(0)~A(m−1)]. The interleaver 1022 can be, e.g., a rectangular interleaver, triangular interleaver, random interleaver, or any other suitable form or configuration for a symbol-level interleaver.

In a further aspect of this disclosure, the bit-level interleaver 1024 and the symbol-level interleaver 1022 may be configured to apply a matching interleaving pattern to their respective sequences, such that the interleaved sequences align with one another when combined in the next step. Here, one or both of the symbol-level interleaver 1022 and/or the bit-level interleaver 1024 may dynamically select or configure the interleaving pattern(s) based on the information message, the modulation and coding scheme, and/or some other suitable parameter to improve the interleaving performance.

In some examples, there are no such restriction on the interleaver types when a plurality of interleavers are used on the transmitter side (e.g., transmitter 102). In an example, transmitter 102 may be configured to utilize the same types or different types of interleavers regardless of the number of interleaver operations transmitter 102 is to perform prior to modulating a signal transmission according to the modulation order (e.g., qam256).

In some examples, the length of the sequence for each of a plurality of interleavers may be the same or different. In the example shown for amplitude interleaver 1022 (e.g., a symbol-level interleaver) and bit interleaver 1024, the length of the sequence is the same for amplitude interleaver 1022 and bit interleaver 1024. In such examples transmitter 102 may determine to utilize the same type of interleaver for each of the plurality of interleavers (e.g., amplitude interleaver 1022 and bit interleaver 1024). The plurality of interleavers may both be rectangular interleavers, for example. In such examples, transmitter 102 may include an interleaver delta when performing the plurality of interleaver operations. In an example, transmitter 102 may implement the plurality of interleaver operations by utilizing a rectangular interleaver for each interleaver. In such examples, transmitter 102 may implement, in a non-limiting examples, the interleaver operations where the input order of rows for amplitude interleaver 1022 and bit interleaver 1024 are different.

At block 1118, the transmitting device may combine the sequence of interleaved amplitude symbols and the sequence of interleaved sign bits to form a sequence of output symbols. For example, a sign multiply block 1016 may multiply each amplitude value Int[A(0)~A(m−1)] by each corresponding sign value Int[S(0)~S(m−1)] in a one-by-one manner across the entire m-length sequence to generate a sequence of output symbols X(0)~X(m−1).

At block 1120, the transmitting device may transmit a waveform modulated according to the sequence of output symbols. For example, a modulator 1026 may generate a sequence of modulated symbols for transmission over one or more antennas by applying QAM (or any other suitable modulation scheme) to the sequence of output symbols X(0)~X(m−1). A transmitter (e.g., the transceiver 610 of the transmitting device 600) may then transmit a waveform based on the modulated symbols utilizing any suitable wireless transmission system.

Bit-Level Interleaver Before Channel Coding

In yet another aspect, the present disclosure provides for the use of a bit-level interleaver to interleave bits of an information message after employing a DM and prior to channel coding. In this example, further interleaving subsequent to channel coding can be omitted.

Figure 12:
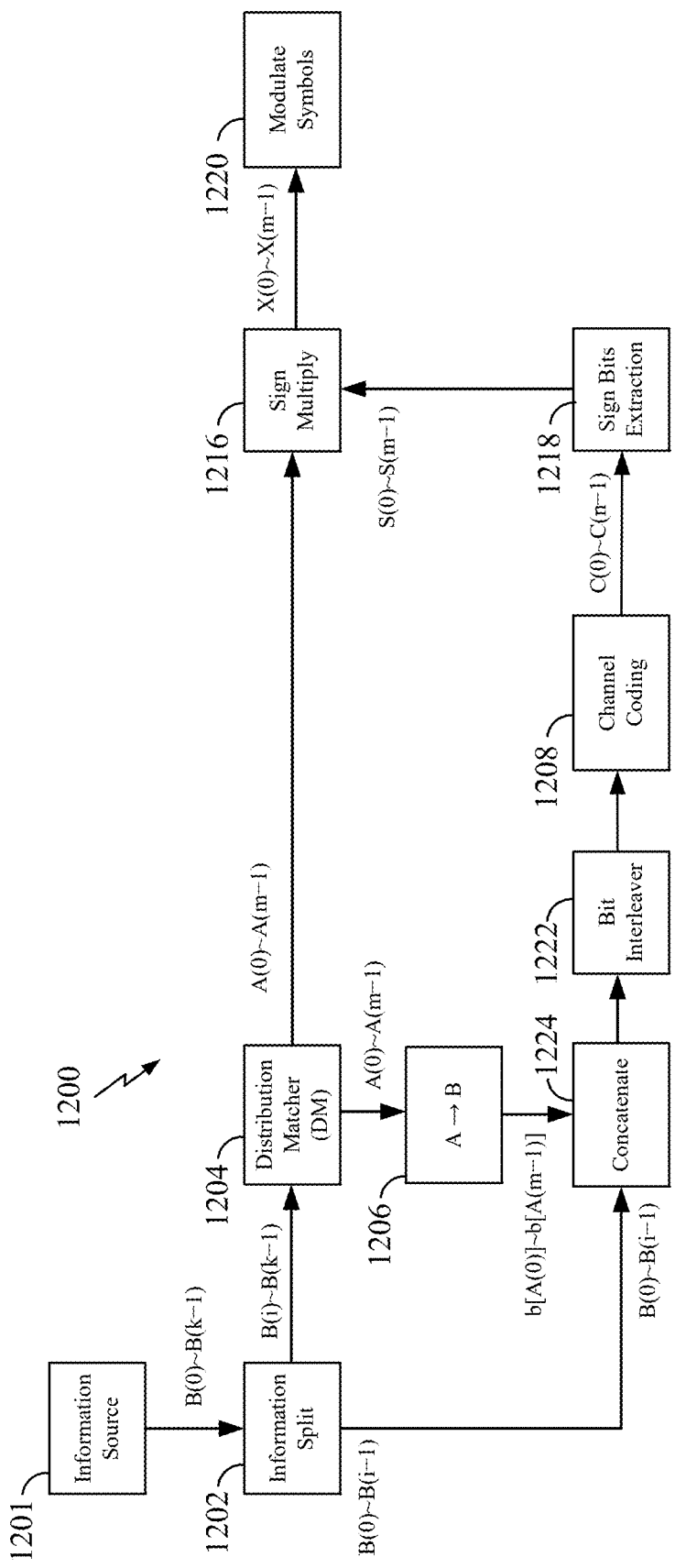
FIG. 12 is a block diagram illustrating an example of a physical layer entity of a transmitting device configured for PAS with bit-level interleaving before channel coding according to some aspects of this disclosure.

FIG. 12 is a schematic block diagram illustrating yet another exemplary structure or technique for interleaving an information message with constellation-shaped modulation according to some aspects of this disclosure. In the illustrated example, the functions or operations shown are performed from the point of view of a physical layer entity in a transmitting device (e.g., the transmitting device 600 described above and illustrated in FIG. 6). For example, an encoder, which may include probabilistic signal shaping and interleaving features, may be configured to implement the process illustrated in FIG. 13.

FIG. 13 is a flow chart illustrating an exemplary process 1300 for interleaving an information message with constellation-shaped modulation in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the transmitting device 600 illustrated in FIG. 6, e.g., employing circuitry and/or software configured according to the block diagram illustrated in FIG. 12. (In the description of the process 1300 that follows, reference is made to the block diagram 1200 illustrated in FIG. 12 for convenience of description.) In some examples, the process 1300 may be carried out by any suitable apparatus or means for carrying out the functions or algorithm described below.

At block 1302, a transmitting device may segment a sequence of information bits into a first sequence of information bits and a second sequence of information bits. For example, a physical layer entity at a transmitting device may receive an information message from an information source 1201, which can be any suitable source of information messages for transmission. In FIG. 12, the information message from the information source 1201 is a sequence B that includes k bits, denoted B(0)~B(k−1), where k>0 is an integer. As illustrated, split block or function 1202 segments, splits, or separates the sequence of information bits B(0)~B(k−1) into a first sequence of information bits B(i)~B(k−1), including a sequence of (k−i) bits, and a second sequence of information bits B(0)~B(i−1), including a sequence of i bits, where i is an integer and 0≤i≤k.

At block 1304, a transmitting device may determine a sequence of amplitude symbols from the first sequence of information bits using a distribution matcher configured for probabilistic amplitude shaping (PAS). For example, as shown in FIG. 12, the first sequence of information bits B(i)~B(k−1) may be provided to a distribution matcher (DM) 1204. The DM 1204 may map its input sequence to an ordered amplitude sequence A(0)~A(m−1) corresponding to a sequence of m probabilistically-shaped amplitude symbols, where m>0 is an integer. For example, in a transmitting device that employs quadrature amplitude modulation (QAM), the sequence of amplitude symbols A(0)~A(m−1) may correspond to a sequence of complex numbers, where A(j)∈ℂ for all values of j. As an example, the DM 1204 may select a suitable amplitude |A(j)| for each symbol of the sequence A(0)~A(m−1) to achieve a desired probabilistically shaped constellation of QAM symbols.

At block 1306, the transmitting device may map the sequence of amplitude symbols to a sequence of binary symbols. For example, as shown in FIG. 12, the amplitude sequence A(0)~A(m−1) is provided to an amplitude-to-binary (A→B) mapping block 1206. At A2B block 1206, an A2B mapper may then apply a suitable b( ) function to map the sequence of amplitude symbols to a binary sequence b[A(0)]~b[A(m−1)].

At block 1308, the transmitting device may combine the second sequence of information bits and the sequence of binary symbols to form an information block. For example, a concatenation block 1224 may concatenate the second sequence of information bits B(0)~B(i−1) with the sequence of binary symbols b[A(0)]~b[A(m−1)] to generate a combined sequence, although any suitable combination of the respective sets may be utilized without altering the principle of operation.

At block 1310, the transmitting device may interleave the information block to generate an interleaved information block. For example, a bit-level interleaver 1222 may interleave the sequence of bits of the information block to generate a sequence of interleaved pre-coding bits.

At block 1312, the transmitting device may apply error correction coding to the sequence of interleaved pre-coding bits to generate a sequence of parity bits. For example, channel coder 1208 may encode the interleaved pre-coding bits to generate an encoded output sequence C(0)~C(n−1). Any suitable systematic or non-systematic error correction code may be utilized, including but not limited to LDPC, polar codes, turbo codes, etc.

At block 1314, the transmitting device may determine a sequence of sign bits from the sequence of parity bits. For example, a sign bits extraction block 1218 may extract a sequence of m sign bits S(0)~S(m−1) from the parity bits C(0)~C(n−1). The sign bits may be represented in any suitable fashion, including but not limited to being represented by a most significant bit (MSB) in a two's complement configuration.

At block 1316, the transmitting device may combine the sequence of amplitude symbols and the sequence of sign bits to form a sequence of output symbols. For example, a sign multiply block 1216 may multiply each amplitude value A(0)~A(m−1) by each corresponding sign value S(0)~S(m−1) in a one-by-one manner across the entire m-length sequence to generate a sequence of output symbols X(0)~X(m−1).

At block 1318, the transmitting device may transmit a waveform modulated according to the sequence of output symbols. For example, a modulator 1220 may generate a sequence of modulated symbols for transmission over one or more antennas by applying QAM (or any other suitable modulation scheme) to the sequence of output symbols X(0)~X(m−1). A transmitter (e.g., the transceiver 610 of the transmitting device 600) may then transmit a waveform based on the modulated symbols utilizing any suitable wireless transmission system.

In some examples, when employing a bit interleaving operation before channel coding as described above and illustrated in FIGS. 12 and 13, some of the output symbols (i.e., those that are subjected to interleaving, corresponding to sequences B(0)~B(i−1) and b[A(0)]~b[A(m−1)]) are not shaped according to PAS. On the other hand, output symbols corresponding to the amplitude sequence A(0)~A(m−1) output from the DM are not subjected to interleaving. Accordingly, when utilizing this design for PAS signal transmission with interleaving, a receiving device receiving the transmitted waveform may employ modified processing to recover the information message. For example, as described further below, a receiving device may first de-interleave the interleaved portion of a set of received symbol estimates, and concatenate those de-interleaved symbols with other received symbol estimates not subjected to interleaving (e.g., the sign bits S(0)~S(m−1) and the second sequence of information bits B(0)~B(i−1)), and provide this combined sequence to a channel decoder for decoding.

Figure 14:
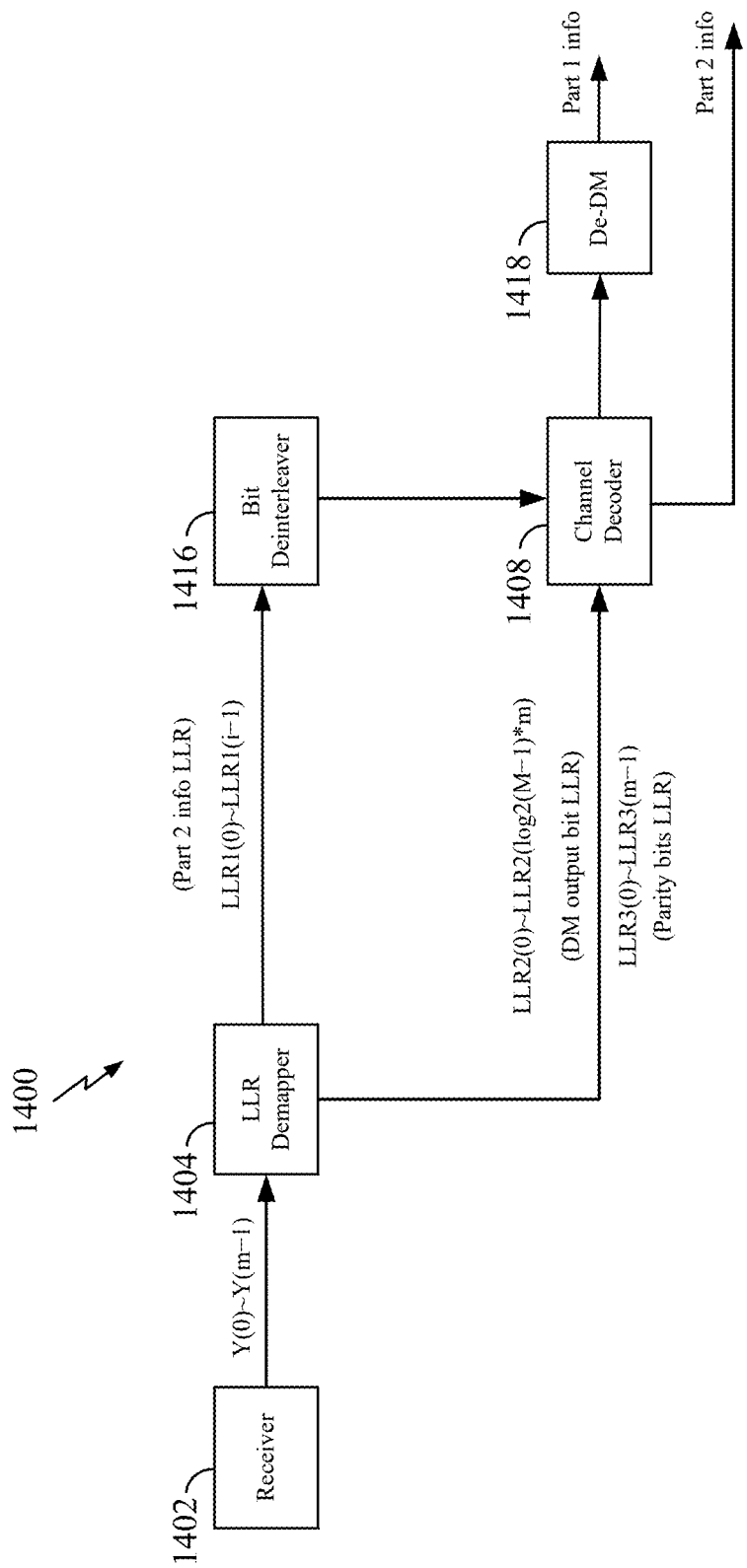
FIG. 14 is a block diagram illustrating an example of physical layer entity of a receiving device configured for receiving a PAS waveform configured according to FIGS. 12-13, according to some aspects of this disclosure.

FIG. 14 is a schematic block diagram illustrating an exemplary structure or technique for de-interleaving an information message with constellation-shaped modulation according to some aspects of this disclosure. In the illustrated example, the functions or operations shown are performed from the point of view of a physical layer entity in a receiving device (e.g., the receiving device 700 described above and illustrated in FIG. 7). For example, a decoder, which may be configured to handle probabilistic signal shaping and de-interleaving features, may be configured to implement the process illustrated in FIG. 15.

FIG. 15 is a flow chart illustrating an exemplary process 1500 for de-interleaving a received information message with constellation-shaped modulation in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the receiving device 700 illustrated in FIG. 7, e.g., employing circuitry and/or software configured according to the block diagram illustrated in FIG. 14. (In the description of the process 1500 that follows, reference is made to the block diagram 1400 illustrated in FIG. 14 for convenience of description.) In some examples, the process 1500 may be carried out by any suitable apparatus or means for carrying out the functions or algorithm described below. It should be noted that FIGS. 14 and 15 are provided to shown an example of a receiver side that corresponds to a particular transmitter side, as described below.

At block 1502, a receiving device may receive a waveform or wireless transmission, carrying an encoded information message. For example, a receiver 1402 may receive a transmission and pass information representing the received symbols Y(0)~Y(m−1) (e.g., in a form of a series of samples of a received waveform stored in memory) to a log-likelihood ratio (LLR) demapper 1404. In an example, the transmission may include a QAM signal that includes a modulated sequence of symbols Y(0)~Y(m−1).

At block 1504, the receiving device may compute LLRs of the received symbols. For example, an LLR demapper 1404 may compute LLRs of the received symbols Y(0)~Y(m−1) to estimate the symbols that the waveform represents. An LLR demapper 1404 may output LLR information that represents the symbols derived from the received wireless transmission. That is, the wireless transmission may be demapped to determine the sequence of symbols represented by the waveform or wireless transmission.

At block 1506, the receiving device (e.g., receiver 106) may provide at least a portion of the LLR information to a de-interleaver. As an example, receiver 106 generally functions to perform a reverse operation of the interleaver(s) at the transmitting device (e.g., bit-level interleaver 1222) and as such, the structure of each interleaver needs to be explicitly informed to receiver 1402. In an example, the transmitter side interleaver(s) (e.g., bit-level interleaver 1222 and symbol-level interleaver 822) is/are defined at transmitter 102. Accordingly, the receiver (108/1402) is to follow the exact reverse operation (e.g., mirror image) when performing the operations of a de-interleaver (e.g., de-interleaver 1416).

In an example, transmitter 102 may be configured to explicitly define the interleaver structures, such as by using a predefined rectangular or triangular interleaver. Transmitter 102 utilizes these interleavers to interleave symbols and/or bits when transmitting an information message via modulator 1220 (e.g., OFDM signal generator 314). In some examples, transmitter 102 and receiver 108 may operate according to configurations that utilize RRC or MAC-CE based signaling to support modifications between the types of interleavers employed at transmitter 102 relative to receiver 108.

While the interleaver being explicitly defined is described, the techniques of this disclosure are not so limited, and it will be understood that other methods of signaling interleaver types may be utilized other than explicit definitions. In any case, signaling may be used to communicate what type of interleaver is used on the transmitter side such that the receiver may perform the reverse interleaver operations via a de-interleaver on the receiver side.

In an example, the LLR demapper 1404 may provide at least a portion of the LLR information (e.g., LLR1(0)~LLR1(I−1), corresponding to estimates of symbols B(0)~B(i−1); and LLR2(0)~LLR(log 2(M−1)·m, corresponding to estimates of symbols b[A(0)]~b[A(m−1)]) to a bit de-interleaver 1416, configured to de-interleave the corresponding received symbol estimates. In an example, the receiving device may apply one or more de-interleavers to de-interleave the sequence of symbols.

In an illustrative and non-limiting example, bit de-interleaver 1416 may be utilized to perform the reverse operation that is illustrated in FIG. 12. That is, at the transmitter side for transmitter 102, the symbol (or bits associated with each symbol) output from DM 1204 is not interleaved. That is, in FIG. 12 a symbol interleaver is not used for the transmitter, only a bit-level interleaver 1222 is used prior to channel coding 1208. Thus, to allow the input to the channel decoder 1408 to include an interleaved sequence of bits (i.e., from LLR demapper 1404), transmitter 102 (via bit interleaver 1222) is configured to pre-interleave the DM output bits (i.e., prior to channel coding 1208)+part2 info bits (i.e., B(0)~B(i−1)) at transmitter 102. As such, receiver 106 may extract the 'interleaved' version of bits interleaved at transmitter 102. In such examples, receiver 106 may receive an indication as to an interleaver pattern that receiver 106 is to employ, the interleaver pattern corresponding to an interleaver pattern used at transmitter 102. In this way, transmitter 102 may transmit non-uniformly distributed symbols via QAM to receiver 106, where the symbols represent an interleaved sequence of bits (e.g., interleaved sequence of associated bits). As such, receiver 106 may perform a de-interleaving operation subsequent to a reverse DM operation (e.g., LLR demapper 1404) in order to receive an information message and decode the message transmitted via modulator 1220. As such, in this example, the symbols transmitted via symbol modulator 1220 (e.g., X(0)~X(m−1)) represent an interleaved, non-uniformly distributed symbol sequence that may be decoded at receiver 106 according to the techniques of this disclosure (e.g., using mirror image de-interleavers).

In an example, receiver 106 may determine that transmitter 102 has transmitted a sequence of modulated non-distribution symbols via modulator 1220 utilizing a bit-level interleaver 1222. Receiver 106 may determine a type of de-interleaver to use based on the one or more interleavers employed at transmitter 102. Bit de-interleaver 1416 is configured to de-interleave the input that is to be processed via channel decoder 1408. In this way, receiver 106 may receive an interleaved sequence of symbols (e.g., once interleaved, twice interleaved, etc.) and decode the interleaved sequence of symbols to retrieve the information message transmitted from transmitter 102 to receiver 106.

At block 1508, the receiving device may apply channel decoding to decode the encoded symbols. For example, the bit de-interleaver 1416 may provide the de-interleaved sequence to the channel decoder 1408. In some examples, the receiving device may further provide at least a portion of the LLR information from the LLR demapper 1404 directly to the channel decoder 1408 for forward error correction decoding. For example, the LLR demapper 1404 may provide LLRs LLR3(0)~LLR3(m−1), corresponding to estimates of symbols A(0)~A(m−1), directly to the channel decoder 1408.

At block 1510, the receiving device may apply a DM de-mapping operation to recover the information message. For example, the channel decoder 1408 may provide decoded bits that correspond to the shaped amplitude sequence A(0)~A(m−1) to a de-DM block (DM de-mapper) 1418, which transforms those bits into the recovered information message. In a further aspect, the channel decoder 1408 may provide decoded bits that were not subjected to amplitude shaping as an output without applying DM de-mapping, corresponding to a portion of a message (e.g., corresponding to symbols B(0)~B(i−1)) that were not subjected to amplitude shaping.

Subband-Associated DM

In an example where a transmitting device utilizes a plurality of subbands in a wireless transmission, the device may separately apply PAS in correspondence with the respective subbands. That is, a transmitting device may include subband-associated DM functions, with a plurality of DMs applying PAS for a plurality of subbands. In this example, according to a further aspect of this disclosure, a receiving device may employ a common bit-level interleaver for interleaving a concatenated sequence corresponding to sign bits from each of the subbands' portions of the information sequence, and a separate symbol-level interleaver per subband (e.g., per DM).

Figure 16:
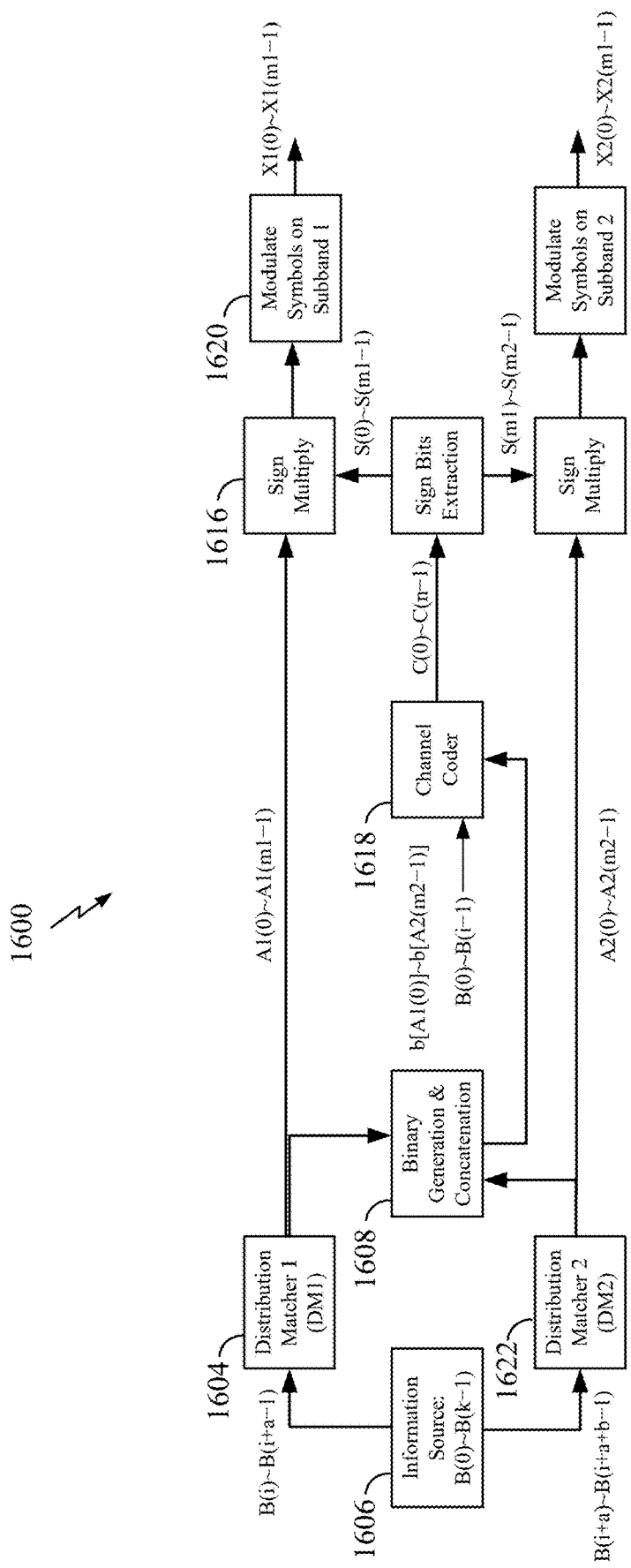
FIG. 16 is a block diagram illustrating an example of a physical layer entity of a transmitting device configured for sub-band-associated distribution matching according to some aspects of this disclosure.

FIG. 16 is a schematic diagram illustrating an exemplary structure or technique for interleaving an information message with constellation-shaped modulation on a plurality of subbands according to some aspects of this disclosure. In this illustration, to simplify the description only two subbands are illustrated. However, those skilled in the art will recognize that the disclosed features can be extended to any suitable number of subbands without substantially changing the principles of operation.

In the illustrated example, a receiving device splits an information sequence into a plurality of sub-sequences, and provides those sub-sequences to respective DMs (DM1 and DM2). After generating corresponding amplitude symbols, according to an aspect of this disclosure, if a symbol-level interleaver is employed (e.g., as described above in the examples shown in FIGS. 8 and 10), separate symbol-level interleaver may separately interleave symbol sequences corresponding to their respective DMs.

Furthermore, as illustrated in FIG. 16, the symbol sequences output from the DMs may be converted to a binary form (e.g., utilizing a suitable A→B block), concatenated with one another, and subjected to channel coding in a similar fashion as described in the above examples. According to an aspect of this disclosure, if a bit-level interleaver is employed (e.g., as described above in the examples shown in FIGS. 10 and 12), a sign bits extraction block may include (or be coupled with) a common bit-level interleaver, applying interleaving to the concatenated sequence of sign bits. The sign bits for the respective subbands may then be segmented from one another and sign multiplied with their respective amplitude symbol sequences and modulated similar to the above examples.

Similar to non-subband interleaving, any combination of the symbol-level interleavers and bit-level interleavers may be used for subband interleaving, described with reference to FIG. 16. That is, for each subband, a distribution matcher may include symbol-level interleaver either prior to encoding the symbols from each respective distribution matcher or after an encoding of the symbols from each respective distribution matcher, or in some instances, each distinct distribution matcher for each subband may be followed by one or more symbol-level interleavers (e.g., DM1 may be followed by two symbol-level interleavers and DM2 may be followed by one symbol-level interleaver either before or after encoding) or in some instances, no symbol-level interleavers, such as when a bit-level interleaver is used prior to channel coding (e.g., channel coder 1618 of FIG. 16). When a symbol-level interleaver is used prior to encoding the symbols for any one or more DM outputs, then a corresponding bit-level interleaver interleaves the respective sign bits following sign bit extraction (e.g., S0~S(m1−1) and/or S(m1)~S(m2−1) depending on the interleaver configuration for the one or more symbol-level interleavers and/or the one or more bit-level interleavers).

In an illustrative example, a symbol-level interleaver may follow either sign multiply block or may only follow one sign multiply block 1616. A chain of interleavers may be used, as well, where a bit interleaver is used prior to channel coder 1618 to interleave a sequence of bits (e.g., concatenated bits output from block 1608) and another one or more bit interleavers are used to interleave a sequence of sign bits S0~S(m1−1), S(m1)~S(m2−1), or both sequences depending whether a symbol interleaver is used prior to multiply block 1616 or after multiply block 1616). In any case, a symbol interleaver may be used as part of the chain of interleavers to follow sign multiply block 1616 regardless of how many bit-level interleavers are used prior to sign multiply block 1616 and regardless of how many bit-level interleavers are used for any subband.

In another illustrative example, again with reference to FIG. 16, the subband architecture including multiple distribution matchers (DM1, DM2, etc.) may only have one bit-level interleaver prior to channel coder 1618 to interleave the output of concatenated bits output from binary generation & concatenation 1608 and to include in the sequence of B(0)~B(i−1) in that bit-level interleaving as well.

In a non-limiting example, a system may include multiple distribution matchers with one or more symbol-level interleavers for each distribution matcher and one or more bit-level interleavers, where the number of bit-level interleavers (e.g., how many bit-level interleaver operations) employed is based upon the number of symbol-level interleavers, the number of distribution matchers (e.g., how many DM operations), and whether any of the symbol-level interleavers are used to interleave a non-encoded sequence of symbols, as described herein. In addition, and with reference again to FIG. 6 for illustration purposes, the bit-level interleavers 645 are used to interleave bits prior to channel coding or after channel coding in those quantities (e.g., a number of interleaver operations) based upon whether any of the symbol-level interleavers 644 are used to interleave a non-encoded sequence of symbols. If a symbol-level interleaver 644 is used to interleave symbols prior to those symbols being multiplied by a sequence of sign bits, then bit-level interleaver 645 will interleave the sequence of sign bits. Processor 604 may, then, perform a combination of the sequence of interleaved sign bits resulting from the bit output of channel coder 642 with the sequence of interleaved symbols following DM 641 operations (e.g., block 1604, block 1622, etc.).

In another example, a common bit-level interleaver may be used for subband-associated DM when multiple DMs are used per each subband. That is, an amplitude-level interleaver may be used for each DM, but a common bit-level interleaver may be used to interleave the bits output from each DM as described, where the output bits correspond to symbols output from each DM according to the binary generation (e.g., A2B). In addition, different subcarriers (e.g., subband channels) may modulate with different modulation order (e.g., QAM order). That is, modulation of symbols output from DM1 may be modulated using a different modulation order than symbols output from DM2 regardless of whether a symbol-level interleaver is employed or not (e.g., a common bit-level interleaver may be employed to interleave the bits for all DMs, where, in turn, each DM output is, nevertheless, modulated according to modulation orders determined for each respective subband channel).

Various examples provided above include one or more interleavers at varied locations in a transmitting device physical layer. According to a further aspect of the present disclosure, a transmitting device may utilize a combination of any two or more of the above examples.

Figure 17:
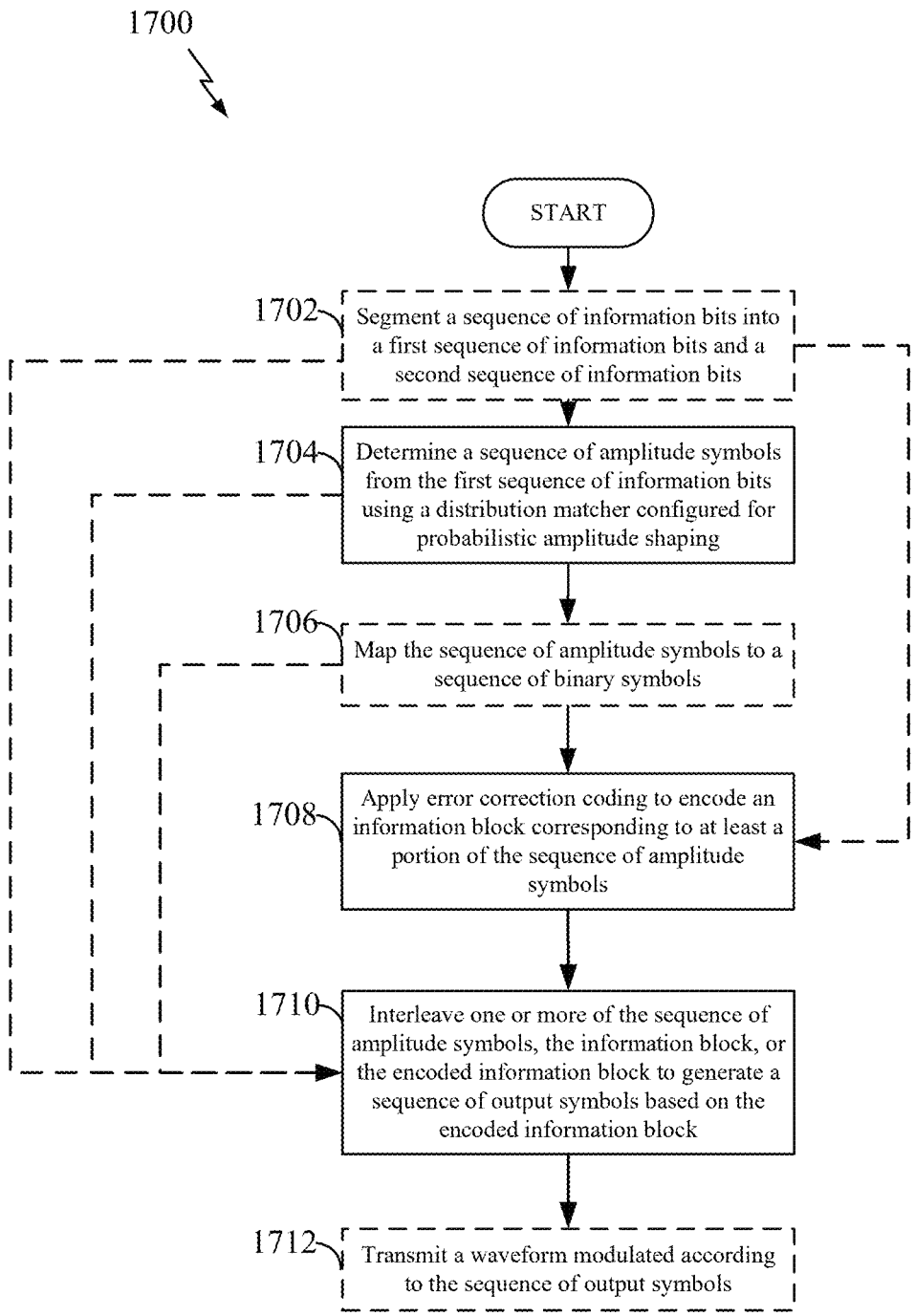
FIG. 17 is a flow chart illustrating an exemplary process for employing interleaving for transmission of a PAS waveform, according to some aspects of this disclosure according to some aspects of this disclosure.

FIG. 17 is a flow chart illustrating an exemplary process 1700 for interleaving an information message with constellation-shaped modulation in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the transmitting device 600 illustrated in FIG. 6. In some examples, the process 900 may be carried out by any suitable apparatus or means for carrying out the functions or algorithm described below.

At block 1702, a wireless communication device may segment a sequence of information bits into a first sequence of information bits and a second sequence of information bits. For example, a bit-level processing circuit 645 may segment, split, or separate a sequence of information bits corresponding to an information message into the respective first and second sequences.

At block 1704, the wireless communication device may determine a sequence of amplitude symbols from the first sequence of information bits using a distribution matcher (DM) configured for probabilistic amplitude shaping. For example, one or more of a DM circuit 641, a symbol-level processing circuit 646 and/or a bit-level processing circuit 645 may map an input sequence (e.g., corresponding to an information message) to an ordered amplitude sequence corresponding to a sequence of probabilistically-shaped amplitude symbols.

At block 1706, the wireless communication device may map the sequence of amplitude symbols to a sequence of binary symbols. For example, one or more of a symbol-level processing circuit 646 and/or a bit-level processing circuit 645 may apply a suitable function to map a sequence of amplitude symbols to a binary sequence.

At block 1708, the wireless communication device may apply error correction coding to encode an information block corresponding to at least a portion of the sequence of amplitude symbols. For example, channel coder 642 may encode its pre-encoding input (e.g., an information block) to generate an encoded output sequence.

At block 1710, the wireless communication device may interleave one or more of the sequence of amplitude symbols, the information block, or the encoded information block to generate a sequence of output symbols based on the encoded information block. For example, a symbol-level interleaver, 644, a bit-level interleaver 643, a symbol-level processing circuit 646, and/or a bit-level processing circuit 645 may interleave a sequence of amplitude symbols and/or a sequence of bits to generate an interleaved sequence of symbols or bits.

At block 1712, the wireless communication device may transmit a waveform modulated according to the sequence of output symbols. For example, a modulator (e.g., included in the transceiver 610 of the transmitting device 600) may generate a sequence of modulated symbols for transmission over one or more antennas by applying QAM (or any other suitable modulation scheme) to the sequence of output symbols. A transmitter (e.g., the transceiver 610 of the transmitting device 600) may then transmit a waveform based on the modulated symbols utilizing any suitable wireless transmission system.

FIGS. 18A-18C are block diagrams illustrating exemplary interleaver designs for employing interleaving for transmission of a PAS waveform, according to some aspects of this disclosure according to some aspects of this disclosure. FIG. 18A illustrates an example interleaver design for implementing rectangular interleaver 1810. Rectangular interleaver 1810 may be implemented as a bit-level interleaver or as a symbol-level interleaver depending on the particular configuration of the PAS system (e.g., interleaver 1810 is a bit-level interleaver when interleaving a bit output from channel coder or bit input into channel coder, or is a symbol-level interleaver when interleaving a symbol output from a distribution matcher). In an example, when interleaver 1810 is a bit-level interleaver, the row input $(i_1\text{-}i_{16})$ represent individual bits that are interleaved as an interleaved bit sequence as represented by a column output from rectangular interleaver 1810. When interleaver 1810 serves as a symbol-level interleaver, the row input $(i_1\text{-}i_{16})$ represent individual symbols that are interleaved as an interleaved sequence of symbols represented by the output from rectangular interleaver 1810. In an illustrative and non-limiting example, the individual symbols may be from sequences A(0)~A(m−1) or X(0)~X(m−1) from FIG. 12, where A(0) and X(0) correspond to a first symbol, and so forth. While described with reference to FIG. 12, the techniques of this disclosure are not so limited. A person of ordinary skill in the art will appreciate that rectangular interleaver 1810 may be implemented for both interleaving symbols and bits, or for one or the other specifically, in other examples, in a variety of implementations as described throughout this disclosure.

Similarly, FIG. 18B illustrates an example interleaver design for implementing triangular interleaver 1820. Triangular interleaver 1820 may be implemented as a bit-level interleaver or as a symbol-level interleaver depending on the particular configuration of the PAS system (e.g., interleaver 1820 is a bit-level interleaver when interleaving a bit output from channel coder or bit input into channel coder, or is a symbol-level interleaver when interleaving a symbol output from a distribution matcher). In an example, when interleaver 1820 is a bit-level interleaver, the row input ($i_1$-$i_{10}$) represent individual bits that are interleaved as an interleaved bit sequence as represented by a column output from triangular interleaver 1820. When interleaver 1820 serves as a symbol-level interleaver, the row input ($i_1$-$i_{10}$) represent individual symbols that are interleaved as an interleaved sequence of symbols represented by the output from triangular interleaver 1820. In an illustrative and non-limiting example, the individual symbols may be from sequences A(0)~A(m−1) or X(0)~X(m−1) from FIG. 12, where A(0) and X(0) correspond to a first symbol, and so forth. While described with reference to FIG. 12, the techniques of this disclosure are not so limited. A person of ordinary skill in the art will appreciate that triangular interleaver 1820 may be implemented for both interleaving symbols and bits, or for one or the other specifically, in other examples, in a variety of implementations as described throughout this disclosure.

Similarly, FIG. 18B illustrates an example interleaver design for implementing random interleaver 1830. Random-type interleaver 1830 may be implemented as a bit-level interleaver or as a symbol-level interleaver depending on the particular configuration of the PAS system (e.g., interleaver 1830 is a bit-level interleaver when interleaving a bit output from channel coder or bit input into channel coder, or is a symbol-level interleaver when interleaving a symbol output from a distribution matcher). In an example, when interleaver 1830 is a bit-level interleaver, the row input ($i_1$-$i_8$) represent individual bits that are interleaved as an interleaved bit sequence as represented by a column output from random interleaver 1830. When interleaver 1830 serves as a symbol-level interleaver, the row input ($i_1$-$i_8$) represent individual symbols that are interleaved as an interleaved sequence of symbols represented by the output from random interleaver 1830. In an illustrative and non-limiting example, the individual symbols may be from sequences A(0)~A(m−1) or X(0)~X(m−1) from FIG. 12, where A(0) and X(0) correspond to a first symbol, and so forth. While described with reference to FIG. 12, the techniques of this disclosure are not so limited. A person of ordinary skill in the art will appreciate that random interleaver 1830 may be implemented for both interleaving symbols and bits, or for one or the other specifically, in other examples, in a variety of implementations as described throughout this disclosure.

It will be understood that any one or more of the various interleaver types, described with reference to, for example, FIGS. 18A-18C, may be used in alone, in interleaver chains, or in combination with other interleaver types, when performing a PAS transmission with channel coding and interleaving and when performing a decoding and de-interleaving, according to one or more of the various techniques of this disclosure.

Further Examples Having a Variety of Features

Example 1: A method, apparatus, and non-transitory computer-readable medium for applying error correction coding to encode an information block corresponding to at least one portion of the sequence of amplitude symbols; generating a sequence of output symbols based on the encoded information block; and applying interleaving to one or more of the sequence of amplitude symbols, the information block, the encoded information block, or a combination of the sequence of amplitude symbols and the encoded information block, for the generating of the sequence of output symbols.

Example 2: A method, apparatus, and non-transitory computer-readable medium of Example 1, further including segmenting an input sequence into the first sequence of information bits and a second sequence of information bits; and combining the second sequence of information bits and a sequence of binary symbols corresponding to the at least one portion of the sequence of amplitude symbols to form the information block.

Example 3: A method, apparatus, and non-transitory computer-readable medium of any of Examples 1 to 2, further including determining an output amplitude sequence based on the sequence of amplitude symbols and the encoded information block, wherein the applying the interleaving comprises applying a symbol-level interleaver to interleave the output amplitude sequence.

Example 4: A method, apparatus, and non-transitory computer-readable medium of any of Examples 1 to 3, wherein applying the interleaving includes: applying a symbol-level interleaver to interleave the sequence of amplitude symbols; and applying a bit-level interleaver to interleave an encoded sequence based on the encoded information block.

Example 5: A method, apparatus, and non-transitory computer-readable medium of any of Examples 1 to 4, wherein generating the sequence of output symbols includes combining the interleaved sequence of amplitude symbols and the interleaved encoded sequence to generate the sequence of output symbols Example 6: A method, apparatus, and non-transitory computer-readable medium of any of Examples 1 to 5, wherein applying the interleaving includes applying a bit-level interleaver to interleave the information block, and wherein the applying error correction coding comprises encoding the interleaved information block.

Example 7: A method, apparatus, and non-transitory computer-readable medium of Example 6, wherein applying the interleaving includes: encoding the sequence of amplitude symbols using the interleaved information block; and applying a symbol-level interleaver to interleave the encoded sequence of amplitude symbols.

Example 8: A method, apparatus, and non-transitory computer-readable medium of any of Examples 1 to 7, wherein applying the interleaving includes utilizing one or more of a random interleaver, a triangular interleaver, or a rectangular interleaver to apply the interleaving for the generating of the sequence of output symbols.

Example 9: A method, apparatus, and non-transitory computer-readable medium of any of Examples 1 to 8, further including transmitting a waveform modulated according to the sequence of output symbols.

Example 10: A method, apparatus, and non-transitory computer-readable medium of Example 9, wherein transmitting the waveform modulated according to the sequence of output symbols comprises: modulating the sequence of output symbols on a plurality of subbands.

Example 11: A method, apparatus, and non-transitory computer-readable medium of any of Examples 1 to 10, wherein the information block represents a concatenation of a plurality of sequences of amplitude symbols, the plurality of sequences of amplitude symbols including the sequence of amplitude symbols determined from the first sequence of information bits.

Example 12: A method, apparatus, and non-transitory computer-readable medium of any of Examples 1 to 11, wherein the error correction coding is based upon a low-density parity-check (LDPC) code.

Example 13: An apparatus for wireless communication, the apparatus including: a processor; a transceiver communicatively coupled to the processor; and a memory communicatively coupled to the processor, wherein the processor and the memory are configured to perform operations provided for in any one of Examples 1 to 12.

Example 14: A non-transitory computer readable medium storing computer-executable code, including code that, when executed, causes a wireless transmitting device to perform operations provided for in any one of Examples 1 to 12.

Example 15: An apparatus for wireless communication, comprising means for performing operations provided for in any one of Examples 1 to 12.

Example 16: A method, apparatus, and non-transitory computer-readable medium for segmenting a sequence of information bits into a first sequence of information bits and a second sequence of information bits; determining a sequence of amplitude symbols based on the first sequence of information bits utilizing a distribution matcher configured for probabilistic amplitude shaping; mapping the sequence of amplitude symbols to a sequence of binary symbols; combining the second sequence of information bits and the sequence of binary symbols to form an information block; applying error correction coding to the information block to generate a sequence of parity bits; determining a sequence of sign bits from the sequence of parity bits; combining the sequence of amplitude symbols and the sequence of sign bits to form a sequence of encoded amplitude symbols; interleaving the sequence of encoded amplitude symbols to generate a sequence of output symbols; and transmitting, via the transceiver, a waveform modulated according to the sequence of output symbols.

Example 17: A method, apparatus, and non-transitory computer-readable medium of Example 16, further including applying a symbol-level interleaver configured to interleave the sequence of encoded amplitude symbols to generate the sequence of output symbols (e.g., for interleaving the sequence of encoded amplitude symbols).

Example 18: A method, apparatus, and non-transitory computer-readable medium of any of Examples 16 to 17, further including multiplying the sequence of sign bits and the sequence of amplitude symbols to form the sequence of encoded amplitude symbols (e.g., for combining the sequence of amplitude symbols and the sequence of sign bits to form the sequence of encoded amplitude symbols).

Example 19: A method, apparatus, and non-transitory computer-readable medium of any of Examples 16 to 18, further including interleaving the sequence of sign bits and the sequence of amplitude symbols to form an interleave of the sequence of encoded amplitude symbols (e.g., for combining the sequence of amplitude symbols and the sequence of sign bits to form the sequence of encoded amplitude symbols).

Example 20: A method, apparatus, and non-transitory computer-readable medium of any of Examples 16 to 19, further including transmitting, via the transmitter, each output symbol of the sequence of output symbols according to a probability associated with each output symbol as determined based at least in part on the distribution matcher (e.g., for transmitting the waveform).

Example 21: A method of wireless communication, comprising operations provided for in any one of Examples 1 to 12 and 16 to 20.

Example 22: A non-transitory computer-readable medium storing computer-executable code, comprising code for causing a wireless transmitting device to perform operations provided for in any one of Examples 1 to 12 and 16 to 20.

Example 23: An apparatus for wireless communication, comprising means for performing operations provided for in any one of Examples 1 to 12 and 16 to 20.

Example 24: A method, apparatus, and non-transitory computer-readable medium for segmenting a sequence of information bits into a first sequence of information bits and a second sequence of information bits; determining a sequence of amplitude symbols based on the first sequence of information bits utilizing a distribution matcher configured for probabilistic amplitude shaping; interleaving the sequence of amplitude symbols to generate a sequence of interleaved amplitude symbols; mapping the sequence of amplitude symbols to a sequence of binary symbols; combining the second sequence of information bits and the sequence of binary symbols to form an information block; applying error correction coding to the information block to generate a sequence of parity bits; determining a sequence of sign bits from the sequence of parity bits; interleaving the sequence of sign bits to generate a sequence of interleaved sign bits; combining the sequence of interleaved amplitude symbols and the sequence of interleaved sign bits to form a sequence of output symbols; and transmitting a waveform modulated according to the sequence of output symbols.

Example 25: A method, apparatus, and non-transitory computer-readable medium of Example 24, further including interleaving the sequence of amplitude symbols utilizing an interleaver configured for random-type interleaving (e.g., for interleaving the sequence of amplitude symbols to generate a sequence of interleaved amplitude symbols).

Example 26: A method, apparatus, and non-transitory computer-readable medium of any of Examples 24 to 25, further including interleaving the sequence of sign bits utilizing a rectangular interleaver (e.g., for interleaving the sequence of sign bits to generate a sequence of interleaved sign bits).

Example 27: A method, apparatus, and non-transitory computer-readable medium of any of Examples 24 to 26, further including modulating the sequence of output symbols on a plurality of subbands (e.g., for transmitting the waveform modulated according to the sequence of output symbols).

Example 28: A method, apparatus, and non-transitory computer-readable medium of any of Examples 24 to 27, further including applying a low-density parity-check encoder to generate the sequence of parity bits (e.g., for applying the error correction coding to the information block).

Example 29: A method, apparatus, and non-transitory computer-readable medium of any of Examples 24 to 28, further including (e.g., for interleaving the sequence of amplitude symbols and to interleave the sequence of sign bits) applying at least one first interleaver configured to interleave the sequence of amplitude symbols; and applying at least one second interleaver configured to interleave the sequence of sign bits. In some examples, the at least one first interleaver and the at least one second interleaver are of a matching interleaver type. In an example, the at least one first interleaver is configured to interleave amplitude symbols according to the matching interleaver type and the at least one second interleaver is configured to interleave bits according to the matching interleaver type. In some examples, the at least one first interleaver and the at least one second interleaver of the Examples do not match (e.g., are of different types).

Example 30: A method, apparatus, and non-transitory computer-readable medium of Example 29, wherein the matching interleaver type is a random-type interleaver or in some instances, is another type of interleaver.

Example 31: A method, apparatus, and non-transitory computer-readable medium of any of Examples 24 to 30, further including the at least one first interleaver being configured to interleave amplitude symbols for a first subband.

Example 32: A method of wireless communication, comprising operations provided for in any one of Examples 1 to 12, 16 to 20, and 24 to 31 (e.g., in combination or otherwise).

Example 33: An apparatus for wireless communication, comprising: a processor; a transceiver communicatively coupled to the processor; and a memory communicatively coupled to the processor, wherein the processor and the memory are configured to perform operations provided for in any one of Examples 1 to 12, 16 to 20, and/or 24 to 31.

Example 34. An apparatus for wireless communication, comprising means for performing operations provided for in any one or more of Examples 1 to 12, 16 to 20, and/or 24 to 31.

Example 35. An apparatus for wireless communication, including means for segmenting a sequence of information bits into a first sequence of information bits and a second sequence of information bits; means for determining a sequence of amplitude symbols based on the first sequence of information bits utilizing a distribution matcher configured for probabilistic amplitude shaping; means for mapping the sequence of amplitude symbols to a sequence of binary symbols; means for combining the second sequence of information bits and the sequence of binary symbols to form an information block; means for interleaving the information block to generate an interleaved information block; means for applying error correction coding to the interleaved information block to generate a sequence of parity bits; means for determining a sequence of sign bits from the sequence of parity bits; means for combining the sequence of amplitude symbols and the sequence of sign bits to form a sequence of output symbols; and means for transmitting a waveform modulated according to the sequence of output symbols.

Example 36: An apparatus configured in accordance with an apparatus such as that of Example 35, where the means for interleaving the information block include utilizing a triangular interleaver specifying a triangular shaped matrix.

Example 37: An apparatus configured in accordance with an apparatus such as that of any of Examples 35 or 36, where the means for transmitting the waveform modulated according to the sequence of output symbols include means for modulating the sequence of output symbols on a plurality of subbands.

Example 38: An apparatus configured in accordance with an apparatus such as that of any of Examples 35 to 37, where the distribution matcher corresponds to a first subband of a plurality of subbands. In some instances, the means for combining the second sequence of information bits and the sequence of binary symbols to form the information block further include means for combining the second sequence of information bits, the sequence of binary symbols, and at least one other sequence of binary symbols to form the information block. The information block is encoded, via an error correction coder (e.g., an LDPC encoder) to produce an encoded information block. A bit-level interleaving performs bit interleaving on the encoded information block and/or on the information block prior to encoding, where if interleaved subsequent to being encoded, a symbol-level interleaver applies to an output of the distribution matcher prior to that output being combined (e.g., multiplied) with the encoded information block.

Example 39: An apparatus configured in accordance with an apparatus such as that of any of Examples 35 to 37 and/or of Example 38, where the means for applying the error correction coding includes a low-density parity-check (LDPC) encoder.

Example 40: A method of wireless communication comprising operations configured to be performed by the means provided for in any one of Examples 35 to 39.

Example 41: An apparatus for wireless communication, the apparatus including a processor; a transceiver communicatively coupled to the processor; and a memory communicatively coupled to the processor, wherein the processor and the memory are configured to perform the operations provided for in any one of Examples 35 to 39 (e.g., as a means for performing such the operations provided for in such examples).

Example 42: A non-transitory computer-readable medium storing computer-executable code, comprising code for causing a wireless transmitting device to perform operations provided for in any one of Examples 35 to 39 (e.g., as a means for performing such the operations provided for in such examples).

Example 43: A method, apparatus, and non-transitory computer-readable medium for processing a waveform received from a transmitter, where the transmitter performs interleaver and probabilistic constellation shaping operations in order to transmit the waveform to a receiver, and where the receiver includes means for performing de-interleaver and demodulation operations in order to process the probabilistically shaped waveform upon receipt. Means for Example 44: A method, apparatus, and non-transitory computer-readable medium configured according to Example 44 may, include, as an example, means for receiving, from a transmitting device, a probabilistically shaped signal (e.g., an information message); means for determining an interleaver configuration utilized by the transmitting device prior to the transmitting device transmitting the signal to the receiver; means for performing a de-interleaver operation in accordance with the interleave configuration; means for decoding the information message; means for de-modulating the received signal to re-produce the information message (e.g., the information message that was transmitted as a probabilistically shaped signal to the receiving device; and means for outputting the re-produced information message (e.g., to a memory device, for display on a display device, for further processing, etc.).

Example 44: A non-transitory computer readable medium storing computer-executable code, where the code, when executed, causes a wireless receiving device to determine an interleaver configuration to apply to an incoming probabilistically shaped signal, decode and demodulate the probabilistically shaped signal in an effort to retrieve/reproduce an information message represented by the incoming probabilistically shaped signal. In an example, the code of Example 44 may cause the wireless receiving device to perform operations provided for by the means outlined in Example 43. The interleaver configuration may be signaled to the receiving device as part of a network configuration transmitted by the transmitter to the receiving device. In an example, the interleaver configuration may specify that a particular type of de-interleaver is to apply at a particular point in time or that multiple de-interleavers are to apply throughout a demodulation and decoding process. For example, the interleaver configuration may specify that a rectangular interleaver was used to interleave output bits from an encoder, and thus, may signify to a receiver that the receiver is to apply a rectangular de-interleaver to de-interleave bits when decoding an information message transmitted via a probabilistically shaped signal. The receiver may also determine a de-interleaver to apply to de-interleave symbols prior to further processing the incoming symbols (e.g., via a de-distribution matcher operation, reverse DM, etc.). The receiver may do so because the receiver may be configured to apply a symbol de-interleaving in instances where the receiver determines a bit-level interleaver was used at a particular point in the transmission process (e.g., following the channel coding operation as opposed to prior to the channel coding operation).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The description of the technology disclosed herein is provided to enable those skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those skilled in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication, comprising:
segmenting an input sequence into a first sequence of information bits and a second sequence of information bits;
determining a sequence of amplitude symbols from the first sequence of information bits using a distribution matcher configured for probabilistic amplitude shaping;
combining the second sequence of information bits and a sequence of binary symbols corresponding to at least one portion of the sequence of amplitude symbols to form an information block;
applying error correction coding to encode the information block;

generating a sequence of output symbols based on the encoded information block; and applying interleaving to one or more of the sequence of amplitude symbols, a sequence of encoded amplitude symbols, the information block, the encoded information block, or a combination of the sequence of amplitude symbols and the encoded information block, for the generating of the sequence of output symbols.

2. The method of claim 1, further comprising:

determining an output amplitude sequence based on the sequence of amplitude symbols and the encoded information block, wherein the applying the interleaving comprises applying a symbol-level interleaver to interleave the output amplitude sequence.

3. The method of claim 1, wherein the applying the interleaving comprises:

applying a symbol-level interleaver to interleave the sequence of amplitude symbols; and applying a bit-level interleaver to interleave an encoded sequence based on the encoded information block.

4. The method of claim 3, wherein generating the sequence of output symbols comprises:

combining the interleaved sequence of amplitude symbols and the interleaved encoded sequence to generate the sequence of output symbols.

5. The method of claim 1, wherein the applying the interleaving comprises:

applying a bit-level interleaver to interleave the information block, wherein the applying error correction coding comprises encoding the interleaved information block.

6. The method of claim 5, wherein the applying the interleaving further comprises:

encoding the sequence of amplitude symbols using the interleaved information block; and applying a symbol-level interleaver to interleave the encoded sequence of amplitude symbols.

7. The method of claim 1, wherein the applying the interleaving comprises:

utilizing one or more of a random interleaver, a triangular interleaver, or a rectangular interleaver to apply the interleaving for the generating of the sequence of output symbols.

8. The method of claim 1, further comprising:

transmitting a waveform modulated according to the sequence of output symbols.

9. The method of claim 8, wherein the transmitting the waveform modulated according to the sequence of output symbols comprises:

modulating the sequence of output symbols on a plurality of subbands.

10. The method of claim 1, wherein the information block represents a concatenation of a plurality of sequences of amplitude symbols, the plurality of sequences of amplitude symbols including the sequence of amplitude symbols determined from the first sequence of information bits.

11. The method of claim 1, wherein the error correction coding comprises a low-density parity-check code.

12. The method of claim 1, wherein applying error correction coding generates a sequence of parity bits, and wherein the method further comprises:

determining a sequence of sign bits from the sequence of parity bits; and combining the sequence of amplitude symbols and the sequence of sign bits to form the sequence of encoded amplitude symbols.

13. The method of claim 12, wherein combining the sequence of amplitude symbols and the sequence of sign bits to form the sequence of encoded amplitude symbols comprises multiplying the sequence of sign bits and the sequence of amplitude symbols.

14. A wireless communication device, comprising:

one or more processors;

one or more transceivers communicatively coupled to the one or more processors; and memory communicatively coupled to the one or more processors, wherein the one or more processors are configured to cause the wireless communication device to:

segment an input sequence into a first sequence of information bits and a second sequence of information bits;

determine a sequence of amplitude symbols from the first sequence of information bits using a distribution matcher configured for probabilistic amplitude shaping;

combine the second sequence of information bits and a sequence of binary symbols corresponding to at least one portion of the sequence of amplitude symbols to form an information block;

apply error correction coding to encode the information block;

generate a sequence of output symbols based on the encoded information block; and apply interleaving to one or more of the sequence of amplitude symbols, a sequence of encoded amplitude symbols, the information block, the encoded information block, or a combination of the sequence of amplitude symbols and the encoded information block, as part of generating of the sequence of output symbols.

15. The wireless communication device of claim 14, wherein the one or more processors are further configured to cause the wireless communication device to:

determine an output amplitude sequence based on the sequence of amplitude symbols and the encoded information block, wherein as part of applying the interleaving the one or more processors are configured to cause the wireless communication device to apply a symbol-level interleaver to interleave the output amplitude sequence.

16. The wireless communication device of claim 14, wherein as part of applying the interleaving, the one or more processors are configured to cause the wireless communication device to:

apply a symbol-level interleaver to interleave the sequence of amplitude symbols; and apply a bit-level interleaver to interleave an encoded sequence based on the encoded information block.

17. The wireless communication device of claim 16, wherein as part of generating the sequence of output symbols, the one or more processors are configured to cause the wireless communication device to combine the interleaved sequence of amplitude symbols and the interleaved encoded sequence to generate the sequence of output symbols.

18. The wireless communication device of claim 14, wherein as part of applying the interleaving, the one or more processors are configured to cause the wireless communication device to:

apply a bit-level interleaver to interleave the information block, wherein as part of applying error correction coding, the one or more processors are configured to cause the wireless communication device to code the interleaved information block.

19. The wireless communication device of claim 18, wherein as part of applying the interleaving, the one or more processors are further configured to cause the wireless communication device to:
  encode the sequence of amplitude symbols using the interleaved information block; and
  apply a symbol-level interleaver to interleave the encoded sequence of amplitude symbols.

20. The wireless communication device of claim 14, wherein as part of applying the interleaving, the one or more processors are configured to cause the wireless communication device to:
  utilize one or more of a random interleaver, a triangular interleaver, or a rectangular interleaver to apply the interleaving for the generating of the sequence of output symbols.

21. The wireless communication device of claim 14, wherein the one or more processors are further configured to cause the wireless communication device to:
  transmit a waveform modulated according to the sequence of output symbols.

22. The wireless communication device of claim 21, wherein as part of transmitting the waveform modulated according to the sequence of output symbols, the one or more processors are configured to cause the wireless communication device to modulate the sequence of output symbols on a plurality of subbands.

23. The wireless communication device of claim 14, wherein the information block represents a concatenation of a plurality of sequences of amplitude symbols, the plurality of sequences of amplitude symbols including the sequence of amplitude symbols determined from the first sequence of information bits.

24. The wireless communication device of claim 14, wherein the error correction coding comprises a low-density parity-check code.

25. The wireless communication device of claim 14, wherein as part of applying error correction coding, the one or more processors are configured to cause the wireless communication device to generate a sequence of parity bits, and wherein the one or more processors are further configured to cause the wireless communication device to:
  determine a sequence of sign bits from the sequence of parity bits; and
  combine the sequence of amplitude symbols and the sequence of sign bits to form the sequence of encoded amplitude symbols.

26. The wireless communication device of claim 25, wherein as part of combining the sequence of amplitude symbols and the sequence of sign bits to form the sequence of encoded amplitude symbols, the one or more processors are configured to cause the wireless communication device to multiply the sequence of sign bits and the sequence of amplitude symbols.

27. A non-transitory computer readable medium storing computer-executable code, comprising code for causing a wireless communication device to:
  segment an input sequence into a first sequence of information bits and a second sequence of information bits;
  determine a sequence of amplitude symbols from the first sequence of information bits using a distribution matcher configured for probabilistic amplitude shaping;
  combine the second sequence of information bits and a sequence of binary symbols corresponding to at least one portion of the sequence of amplitude symbols to form an information block;
  apply error correction coding to encode the information block;
  generate a sequence of output symbols based on the encoded information block; and
  apply interleaving to one or more of the sequence of amplitude symbols, a sequence of encoded amplitude symbols, the information block, the encoded information block, or a combination of the sequence of amplitude symbols and the encoded information block, as part of generating of the sequence of output symbols.

28. A wireless communication device, comprising:
  means for segmenting an input sequence into a first sequence of information bits and a second sequence of information bits;
  means for determining a sequence of amplitude symbols from the first sequence of information bits using a distribution matcher configured for probabilistic amplitude shaping;
  means for combining the second sequence of information bits and a sequence of binary symbols corresponding to at least one portion of the sequence of amplitude symbols to form an information block;
  means for applying error correction coding to encode the information block;
  means for generating a sequence of output symbols based on the encoded information block; and
  means for applying interleaving to one or more of the sequence of amplitude symbols, a sequence of encoded amplitude symbols, the information block, the encoded information block, or a combination of the sequence of amplitude symbols and the encoded information block, for the generating of the sequence of output symbols.

* * * * *